(12) United States Patent
Krenn et al.

(10) Patent No.: US 12,266,061 B2
(45) Date of Patent: Apr. 1, 2025

(54) VIRTUAL PERSONAL INTERFACE FOR CONTROL AND TRAVEL BETWEEN VIRTUAL WORLDS

(71) Applicant: Meta Platforms Technologies, LLC, Menlo Park, CA (US)

(72) Inventors: Matthaeus Krenn, Sunnyvale, CA (US); Jeremy Edelblut, Alameda, CA (US); John Nicholas Jitkoff, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 77 days.

(21) Appl. No.: 18/056,461

(22) Filed: Nov. 17, 2022

(65) Prior Publication Data

US 2023/0419618 A1 Dec. 28, 2023

Related U.S. Application Data

(63) Continuation of application No. 17/867,724, filed on Jul. 19, 2022.
(Continued)

(51) Int. Cl.
*G06T 19/00* (2011.01)
*G06F 3/04815* (2022.01)
*G06F 3/04842* (2022.01)

(52) U.S. Cl.
CPC ........ *G06T 19/006* (2013.01); *G06F 3/04815* (2013.01); *G06F 3/04842* (2013.01)

(58) Field of Classification Search
CPC ............... G06T 19/006; G06F 3/04815; G06F 3/04842
See application file for complete search history.

(56) References Cited

U.S. PATENT DOCUMENTS 6,842,175 B1    1/2005  Schmalstieg et al.
7,701,439 B2    4/2010  Hillis et al.
(Continued)

FOREIGN PATENT DOCUMENTS

CN    101996077 A    3/2011
EP      3719616 A1   10/2020
(Continued)

OTHER PUBLICATIONS

International Search Report and Written Opinion for International Application No. PCT/US2023/018759, mailed Jun. 14, 2023, 9 pages.
(Continued)

*Primary Examiner* — Grace Q Li
(74) *Attorney, Agent, or Firm* — Potomac Law Group, PLLC; Dannon G. Allbee

(57) ABSTRACT

Methods and systems described herein are directed to a virtual personal interface (herein "personal interface") for controlling an artificial reality (XR) environment, such as by providing user interfaces for interactions with a current XR application, providing detail views for selected items, navigating between multiple virtual worlds without having to transition in and out of a home lobby for those worlds, executing aspects of a second XR application while within a world controlled by a first XR application, and providing 3D content that is separate from the current world. While in at least one of those worlds, the personal interface can itself present content in a runtime separate from the current virtual world, corresponding to an item, action, or application for that world. XR applications can be defined for use with the personal interface to create both a 3D world portion and 2D interface portions that are displayed via the personal interface.

20 Claims, 17 Drawing Sheets

Related U.S. Application Data

(60) Provisional application No. 63/354,360, filed on Jun. 22, 2022.

(56) References Cited

U.S. PATENT DOCUMENTS

| | | |
|---|---|---|
| 8,424,075 B1 | 4/2013 | Walsh et al. |
| D683,749 S | 6/2013 | Hally |
| D689,874 S | 9/2013 | Brinda et al. |
| 8,947,351 B1 | 2/2015 | Noble |
| D726,219 S | 4/2015 | Chaudhri et al. |
| D727,352 S | 4/2015 | Ray et al. |
| D727,354 S | 4/2015 | Park et al. |
| D733,740 S | 7/2015 | Lee et al. |
| 9,117,274 B2 | 8/2015 | Liao et al. |
| 9,292,089 B1 | 3/2016 | Sadek |
| D761,273 S | 7/2016 | Kim et al. |
| D763,279 S | 8/2016 | Jou |
| 9,477,368 B1 | 10/2016 | Filip et al. |
| D775,179 S | 12/2016 | Kimura et al. |
| D775,196 S | 12/2016 | Huang et al. |
| D780,794 S | 3/2017 | Kisielius et al. |
| D781,905 S | 3/2017 | Nakaguchi et al. |
| D783,037 S | 4/2017 | Hariharan et al. |
| D784,394 S | 4/2017 | Laing et al. |
| D784,395 S | 4/2017 | Laing et al. |
| D787,527 S | 5/2017 | Wilberding |
| D788,136 S | 5/2017 | Jaini et al. |
| D788,793 S | 6/2017 | Ogundokun et al. |
| D789,416 S | 6/2017 | Baluja et al. |
| D789,977 S | 6/2017 | Mijatovic et al. |
| D790,567 S | 6/2017 | Su et al. |
| D791,823 S | 7/2017 | Zhou |
| D793,403 S | 8/2017 | Cross et al. |
| 9,817,472 B2 | 11/2017 | Lee et al. |
| D817,994 S | 5/2018 | Jou |
| D819,065 S | 5/2018 | Xie et al. |
| D824,951 S | 8/2018 | Kolbrener et al. |
| D828,381 S | 9/2018 | Lee et al. |
| D829,231 S | 9/2018 | Hess et al. |
| D831,681 S | 10/2018 | Eilertsen |
| D835,665 S | 12/2018 | Kimura et al. |
| 10,168,768 B1 | 1/2019 | Kinstner |
| D842,889 S | 3/2019 | Krainer et al. |
| 10,220,303 B1 | 3/2019 | Schmidt et al. |
| 10,248,284 B2 | 4/2019 | Itani et al. |
| D848,474 S | 5/2019 | Baumez et al. |
| D850,468 S | 6/2019 | Malahy et al. |
| D851,123 S | 6/2019 | Turner |
| D853,431 S | 7/2019 | Sagrillo et al. |
| D854,551 S | 7/2019 | Pistiner et al. |
| D856,366 S | 8/2019 | Richardson |
| D859,426 S | 9/2019 | Poes |
| 10,473,935 B1 | 11/2019 | Gribetz et al. |
| 10,521,944 B2 | 12/2019 | Sareen et al. |
| 10,592,064 B2 | 3/2020 | Ames et al. |
| 10,665,019 B2 | 5/2020 | Hildreth et al. |
| D888,071 S | 6/2020 | Wilberding |
| D900,123 S | 10/2020 | Lopes |
| D908,713 S | 1/2021 | Fremine et al. |
| D910,655 S | 2/2021 | Matthewman et al. |
| D910,660 S | 2/2021 | Chaturvedi et al. |
| 10,916,220 B2 | 2/2021 | Ngo |
| 10,948,997 B1 | 3/2021 | Victor-Faichney et al. |
| 10,987,573 B2 | 4/2021 | Nietfeld et al. |
| 11,086,476 B2 | 8/2021 | Inch et al. |
| 11,164,378 B1 | 11/2021 | Cowen et al. |
| 11,380,021 B2 | 7/2022 | Nakata |
| 11,520,707 B2 | 12/2022 | Satpathy et al. |
| 11,556,169 B2 | 1/2023 | Wallen et al. |
| 11,556,220 B1 | 1/2023 | Inch et al. |
| 11,676,351 B1 | 6/2023 | Yang et al. |
| 11,755,180 B1 | 9/2023 | Edelblut et al. |
| 11,836,205 B2 | 12/2023 | Inch et al. |
| 11,928,314 B2 | 3/2024 | Edelblut et al. |
| 2002/0073043 A1 | 6/2002 | Herman et al. |
| 2005/0060661 A1 | 3/2005 | Kawahara et al. |
| 2008/0089587 A1 | 4/2008 | Kim et al. |
| 2008/0155118 A1 | 6/2008 | Glaser et al. |
| 2009/0103780 A1 | 4/2009 | Nishihara et al. |
| 2009/0279784 A1 | 11/2009 | Arcas et al. |
| 2010/0005424 A1 | 1/2010 | Sundaresan et al. |
| 2010/0050219 A1 | 2/2010 | Angiolillo et al. |
| 2010/0083112 A1 | 4/2010 | Dawson et al. |
| 2010/0169837 A1 | 7/2010 | Hyndman |
| 2010/0208033 A1 | 8/2010 | Edge et al. |
| 2010/0306716 A1 | 12/2010 | Perez |
| 2010/0332996 A1 | 12/2010 | Sarkaria |
| 2010/0332997 A1 | 12/2010 | Hamilton, II et al. |
| 2011/0055090 A1* | 3/2011 | Ross .................. G06Q 50/184 |
| | | 707/758 |
| 2011/0161843 A1 | 6/2011 | Bennett et al. |
| 2011/0164269 A1 | 7/2011 | Kamishiro |
| 2011/0267265 A1 | 11/2011 | Stinson |
| 2011/0276477 A1 | 11/2011 | Shuster |
| 2011/0302535 A1 | 12/2011 | Clerc et al. |
| 2012/0069168 A1 | 3/2012 | Huang et al. |
| 2012/0115122 A1* | 5/2012 | Bruce .................. G06F 9/453 |
| | | 434/323 |
| 2012/0143358 A1 | 6/2012 | Adams et al. |
| 2012/0206345 A1 | 8/2012 | Langridge |
| 2012/0249797 A1 | 10/2012 | Haddick et al. |
| 2012/0275686 A1 | 11/2012 | Wilson et al. |
| 2012/0293544 A1 | 11/2012 | Miyamoto et al. |
| 2013/0044128 A1 | 2/2013 | Liu et al. |
| 2013/0063345 A1 | 3/2013 | Maeda |
| 2013/0125066 A1 | 5/2013 | Klein et al. |
| 2013/0141428 A1 | 6/2013 | Gipson |
| 2013/0147793 A1 | 6/2013 | Jeon et al. |
| 2013/0178257 A1 | 7/2013 | Langseth |
| 2013/0179761 A1 | 7/2013 | Cho et al. |
| 2013/0265220 A1 | 10/2013 | Fleischmann et al. |
| 2014/0019609 A1 | 1/2014 | Williams et al. |
| 2014/0037218 A1 | 2/2014 | Zweig et al. |
| 2014/0125598 A1 | 5/2014 | Cheng et al. |
| 2014/0200084 A1 | 7/2014 | Butler et al. |
| 2014/0236996 A1 | 8/2014 | Masuko et al. |
| 2014/0316990 A1 | 10/2014 | Winston |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0179147 A1 | 6/2015 | Rezaiifar et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0261659 A1 | 9/2015 | Bader et al. |
| 2015/0293666 A1 | 10/2015 | Lee et al. |
| 2015/0371441 A1 | 12/2015 | Shim |
| 2016/0044298 A1 | 2/2016 | Holz et al. |
| 2016/0062618 A1 | 3/2016 | Fagan et al. |
| 2016/0110052 A1 | 4/2016 | Kim et al. |
| 2016/0147308 A1 | 5/2016 | Gelman et al. |
| 2016/0378291 A1 | 12/2016 | Pokrzywka |
| 2017/0003750 A1 | 1/2017 | Li |
| 2017/0031503 A1 | 2/2017 | Rosenberg et al. |
| 2017/0039770 A1 | 2/2017 | Lanier et al. |
| 2017/0060230 A1 | 3/2017 | Faaborg et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0236196 A1 | 8/2017 | Isaacson et al. |
| 2017/0236320 A1 | 8/2017 | Gribetz et al. |
| 2017/0237789 A1 | 8/2017 | Harner et al. |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0308608 A1 | 10/2017 | Freeman |
| 2017/0316606 A1 | 11/2017 | Khalid et al. |
| 2017/0336951 A1 | 11/2017 | Palmaro |
| 2017/0364198 A1 | 12/2017 | Yoganandan et al. |
| 2018/0024623 A1 | 1/2018 | Faaborg et al. |

(56) References Cited

U.S. PATENT DOCUMENTS

| | | |
|---|---|---|
| 2018/0040044 A1 | 2/2018 | Mattingly et al. |
| 2018/0053351 A1 | 2/2018 | Anderson |
| 2018/0059901 A1 | 3/2018 | Gullicksen |
| 2018/0059902 A1 | 3/2018 | Martin |
| 2018/0098059 A1 | 4/2018 | Valdivia et al. |
| 2018/0107278 A1 | 4/2018 | Goel et al. |
| 2018/0113599 A1 | 4/2018 | Yin |
| 2018/0143757 A1 | 5/2018 | Champion et al. |
| 2018/0144556 A1 | 5/2018 | Champion et al. |
| 2018/0207522 A1 | 7/2018 | Roman et al. |
| 2018/0307303 A1 | 10/2018 | Powderly et al. |
| 2018/0322674 A1 | 11/2018 | Du |
| 2018/0322701 A1 | 11/2018 | Pahud et al. |
| 2018/0335925 A1 | 11/2018 | Hsiao et al. |
| 2018/0342106 A1 | 11/2018 | Rosado |
| 2018/0349690 A1 | 12/2018 | Rhee et al. |
| 2018/0361258 A1 | 12/2018 | Malyuk |
| 2019/0005716 A1 | 1/2019 | Singh et al. |
| 2019/0026936 A1 | 1/2019 | Gorur Sheshagiri et al. |
| 2019/0035152 A1 | 1/2019 | Kazansky |
| 2019/0065027 A1 | 2/2019 | Hauenstein et al. |
| 2019/0088030 A1 | 3/2019 | Masterson et al. |
| 2019/0094981 A1 | 3/2019 | Bradski et al. |
| 2019/0107894 A1 | 4/2019 | Hebbalaguppe et al. |
| 2019/0121522 A1 | 4/2019 | Davis et al. |
| 2019/0139321 A1 | 5/2019 | Kocharlakota et al. |
| 2019/0197780 A1 | 6/2019 | Rao |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0287307 A1 | 9/2019 | Rogers et al. |
| 2019/0295101 A1 | 9/2019 | Porter et al. |
| 2019/0302895 A1 | 10/2019 | Jiang et al. |
| 2019/0304166 A1 | 10/2019 | Yu et al. |
| 2019/0306137 A1* | 10/2019 | Isaacson ............... G06Q 20/12 |
| 2019/0310757 A1 | 10/2019 | Lee et al. |
| 2019/0340818 A1 | 11/2019 | Furtwangler |
| 2019/0347762 A1 | 11/2019 | Hwang et al. |
| 2019/0362562 A1 | 11/2019 | Benson |
| 2019/0377416 A1 | 12/2019 | Alexander |
| 2019/0385372 A1 | 12/2019 | Cartwright et al. |
| 2020/0020165 A1 | 1/2020 | Tran et al. |
| 2020/0050289 A1 | 2/2020 | Hardie-Bick et al. |
| 2020/0051527 A1 | 2/2020 | Ngo |
| 2020/0089390 A1 | 3/2020 | Bakhash |
| 2020/0097077 A1 | 3/2020 | Nguyen et al. |
| 2020/0097091 A1 | 3/2020 | Chou et al. |
| 2020/0111260 A1 | 4/2020 | Osborn et al. |
| 2020/0151965 A1 | 5/2020 | Forbes et al. |
| 2020/0193649 A1 | 6/2020 | Moon et al. |
| 2020/0218342 A1 | 7/2020 | Murali et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0241730 A1 | 7/2020 | DiVerdi et al. |
| 2020/0245017 A1 | 7/2020 | Ganschow et al. |
| 2020/0258278 A1 | 8/2020 | Mirhosseini et al. |
| 2020/0279044 A1 | 9/2020 | Lum et al. |
| 2020/0293178 A1 | 9/2020 | Kumar et al. |
| 2020/0294097 A1 | 9/2020 | Spivack et al. |
| 2020/0302680 A1 | 9/2020 | Yip et al. |
| 2020/0320794 A1 | 10/2020 | Huang et al. |
| 2020/0401687 A1 | 12/2020 | Mak |
| 2021/0005022 A1 | 1/2021 | Oser et al. |
| 2021/0011556 A1 | 1/2021 | Atlas et al. |
| 2021/0089639 A1 | 3/2021 | Remillet et al. |
| 2021/0090333 A1 | 3/2021 | Ravasz et al. |
| 2021/0103447 A1 | 4/2021 | Wei et al. |
| 2021/0124475 A1 | 4/2021 | Inch et al. |
| 2021/0168324 A1 | 6/2021 | Ngo |
| 2021/0201029 A1 | 7/2021 | Ju et al. |
| 2021/0252392 A1 | 8/2021 | Stevens |
| 2021/0271370 A1 | 9/2021 | Williams et al. |
| 2021/0343182 A1 | 11/2021 | Lu |
| 2021/0375065 A1 | 12/2021 | Cannefax et al. |
| 2021/0398095 A1 | 12/2021 | Mallett et al. |
| 2022/0036447 A1 | 2/2022 | Spivack et al. |
| 2022/0207830 A1 | 6/2022 | Allen et al. |
| 2022/0254114 A1 | 8/2022 | Frederick et al. |
| 2022/0292543 A1 | 9/2022 | Henderson |
| 2022/0308716 A1 | 9/2022 | Rice |
| 2022/0387873 A1 | 12/2022 | Hall et al. |
| 2022/0414487 A1 | 12/2022 | Si et al. |
| 2023/0092103 A1 | 3/2023 | Puyol et al. |
| 2023/0120052 A1 | 4/2023 | Wallen et al. |
| 2023/0152936 A1 | 5/2023 | Inch et al. |
| 2023/0171438 A1 | 6/2023 | Liu et al. |
| 2023/0245350 A1 | 8/2023 | Webber et al. |
| 2023/0325896 A1 | 10/2023 | Luker |
| 2023/0419617 A1 | 12/2023 | Krenn et al. |
| 2024/0061545 A1 | 2/2024 | Gu et al. |
| 2024/0070215 A1 | 2/2024 | Inch et al. |
| 2024/0073489 A1 | 2/2024 | Hopmann |
| 2024/0112409 A1 | 4/2024 | Cross et al. |
| 2024/0160337 A1 | 5/2024 | Edelblut et al. |

FOREIGN PATENT DOCUMENTS

| | | |
|---|---|---|
| JP | 2001325616 A | 11/2001 |
| JP | 2009140294 A | 6/2009 |
| JP | 2014071498 A | 4/2014 |
| JP | 2018109835 A | 7/2018 |
| KR | 20170126362 A | 11/2017 |
| WO | 2022006661 A1 | 1/2022 |
| WO | 2022170222 A1 | 8/2022 |

OTHER PUBLICATIONS

Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-winter/Handouts/chen-medioni-align-rob91.pdf.

Foxman M., et al., "United We Stand: Platforms, Tools and Innovation with the Unity Game Engine," Social Media Society, Nov. 21, 2019, 10 pages.

Hincapie-Ramos J.D., et aL, "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/052976, mailed May 5, 2022, 9 pages.

International Search Report and Written Opinion for International Application No. PCT/US2020/052976, mailed Dec. 11, 2020, 10 Pages.

International Search Report and Written Opinion for International Application No. PCT/US2021/064674, mailed Apr. 19, 2022, 13 pages.

International Search Report and Written Opinion for International Application No. PCT/US2022/016110, mailed Apr. 29, 2022, 12 pages.

International Search Report and Written Opinion for International Application No. PCT/US2023/017413, mailed Jul. 4, 2023, 12 pages.

Katz N., et al., "Extending Web Browsers with a Unity 3D-Based Virtual Worlds Viewer," IEEE Computer Society, Sep./Oct. 2011, vol. 15 (5), pp. 15-21.

Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Milborrow S., "Active Shape Models with Stasm," [Retrieved on Sep. 20, 2022], 3 pages, Retrieved from the internet: URL: http://www.milbo.users.sonic.net/stasm/.

(56) References Cited

OTHER PUBLICATIONS

Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and- mars.pdf.

MRPT: "RANSAC C++ Examples," 2014, 6 pages, Retrieved from the internet: URL: https://www.mrpt.org/tutorials/programming/maths-and-geometry/ransac-c-examples/.

Office Action mailed Nov. 8, 2023 for European Patent Application No. 20789416.3, filed on Sep. 27, 2020, 4 pages.

Office Action mailed Mar. 14, 2024 for Chinese Application No. 202080057590.5, filed Sep. 27, 2020, 9 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Orland K., "So What is the "Metaverse," Exactly?," ars Technica, Dec. 7, 2021 [Retrieved on Jun. 16, 2023], pp. 1-14, Retrieved from the Internet: https://web.archive.org/web/20220407114023/https://arstechnica.com/gaming/2021/11/everyone-pitching-the-metaverse-has-a-different-idea-of-what-it-is/.

Qiao X., et al., "Web AR: A Promising Future for Mobile Augmented Reality—State of the Art, Challenges, and Insights," Proceedings of the IEEE, Apr. 2019, vol. 107 (4), pp. 651-666.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

Srinivasa R.R., "Augmented Reality Adaptive Web Content," 13th IEEE Annual Consumer Communications Networking Conference (CCNC), 2016, pp. 1-4.

Trademark U.S. Appl. No. 73/289,805, filed Dec. 15, 1980,1 page.
Trademark U.S. Appl. No. 73/560,027, filed Sep. 25, 1985,1 page.
Trademark U.S. Appl. No. 74/155,000, filed Apr. 8, 1991, 1 page.
Trademark U.S. Appl. No. 76/036,844, filed Apr. 28, 2000, 1 page.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Webxr: "WebXR Device API Explained," Aug. 23, 2021, 31 pages, Retrieved from the Internet URL: https://web.archive.Org/web/20210823211837/https://immersive-web.github.io/webxr/explainer.html#objectdata-visualization.

Whitton M., et al., "Integrating Real and Virtual Objects in Virtual Environments," Aug. 24, 2007, Retrieved from http://web.archive.org/web/20070824035829/ http://www.cs.unc.edu/~whitton/ExtendedCV/Papers/2005-HCII-Whitton-MixedEnvs.pdf, on May 3, 2017, 10 pages.

Wikipedia: "Canny Edge Detector," [Retrieved on Sep. 20, 2022], 10 pages, Retrieved from the internet: URL: https://en.wikipedia.org/wiki/Canny_edge_detector.

Wikipedia: "Iterative Closest Point," [Retrieved on Sep. 20, 2022], 3 pages, Retrieved from the internet: URL: https://en.wikipedia.org/wiki/Iterative_closest_point.

YouTube: "V1 VR NFT Art Gallery is Live! OnCyber.xyz/ArtisMyWeapon," Art is My Weapon, Jan. 19, 2022, 2 pages, Retrieved from the Internet URL: https://www.youtube.com/watch?v=BMfLjrkpGb0.

David H., "Oculus Developer Hub can now Launch WebXR URLs on Your Quest," uploadvr.com, Dec. 4, 2021, 2 pages, Retrieved from the Internet: https://web.archive.org/web/20211204181804/https://www.uploadvr.com/oculus-developer-hub-web-urls-metrics/.

International Search Report and Written Opinion for International Application No. PCT/US2023/025685, mailed Oct. 5, 2023, 9 pages.

International Search Report and Written Opinion for International Application No. PCT/US2023/030469, mailed Nov. 20, 2023, 12 pages.

International Search Report and Written Opinion for International Application No. PCT/US2023/032524, mailed Nov. 16, 2023, 9 pages.

Oculus VR., "Oculus Developer Hub Update 1.8," Oculus, 5 pages, Jun. 22, 2021, Retrieved from the Internet: https://web.archive.org/web/20210622003501/https://developer.oculus.com/blog/oculus-developer-hub-update-18/.

International Search Report and Written Opinion for International Application No. PCT/US2023/025680, mailed Sep. 8, 2023, 11 pages.

Office Action mailed Jul. 30, 2024 for Japanese Patent Application No. 2022-500566, filed on Sep. 27, 2020, 7 pages.

Bhattacharyya A., "Reimagining the Internet: This Browser Allows Users to View Websites in 3D," Hindustan Times, Toronto, Jul. 11, 2017, pp. 1-8, Retrieved from Internet URL: https://www.hindustantimes.com/world-news/this-browser-allows-users-to-view-websites-in-3d/ story-ts6MPeGeuEAGdR8b7cPleL.html.

International Preliminary Report on Patentability for International Application No. PCT/US2023/017413, mailed Oct. 17, 2024, 10 pages.

International Preliminary Report on Patentability for International Application No. PCT/US2023/018759, mailed Oct. 31, 2024, 8 pages.

* cited by examiner

VIRTUAL PERSONAL INTERFACE FOR CONTROL AND TRAVEL BETWEEN VIRTUAL WORLDS

RELATED APPLICATIONS

This application is a continuation of U.S. application Ser. No. 17/867,724, entitled "Virtual Personal Interface for Control and Travel Between Virtual Worlds," filed on Jul. 19, 2022, which claims priority to U.S. Provisional Patent Application No. 63/354,360, entitled "Virtual Personal Interface for Control and Travel Between Virtual Worlds," filed on Jun. 22, 2022, and is related to U.S. patent application Ser. No. 17/820,678, entitled "Browser Enabled Switching Between Virtual Worlds in Artificial Reality," filed Aug. 18, 2022, U.S. patent application Ser. No. 18/056,474, entitled "Browser Enabled Switching Between Virtual Worlds in Artificial Reality," filed Nov. 17, 2022, and U.S. patent application Ser. No. 17/724,597, filed Apr. 20, 2022 and entitled, "An Artificial Reality Browser Configured to Trigger an Immersive Experience," the entire contents of each of which are hereby incorporated by reference in their entireties.

TECHNICAL FIELD

The present disclosure is directed to methods and systems for controlling and navigating between multiple virtual worlds in artificial reality without having to transition in and out of a home lobby.

BACKGROUND

Artificial reality systems offer a user a plethora of opportunities to experience what it might be like to visit desired places, participate in certain events, interact with particular individuals, etc. Often, these activities occur within the context of a virtual world delivered by an artificial reality application designed to simulate real-life encounters. For instance, such a virtual world can depict scenes for locations that can be controlled to immerse a user in the happenings within the world as if the user were actually there.

In some scenarios, a user may like to travel to a subsequent virtual world as a result of being intrigued by activities or things experienced in a current world. Otherwise, such a travel desire may be the result of a user having concluded a virtual world event or merely becoming more interested in a diversity of artificial reality offerings.

In an artificial reality environment, some objects a user sees and interacts with are "virtual objects," i.e., computer generated object representations. Virtual objects can be presented, e.g., by a head-mounted display, mobile device, projection system, etc. Often, users can interact with virtual objects using controllers and/or hand gestures. In systems that include hand tracking, images of the user's hands can be interpreted to create 3D models of the user's hands or to otherwise estimate hand postures. In some systems, user hand gestures can perform "interactions" with virtual objects that can include selecting, moving, rotating, resizing, actuating controls, changing colors or skins, defining interactions between real or virtual objects, setting virtual forces to act on virtual objects, or any other action on or change to an object that a user can imagine.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
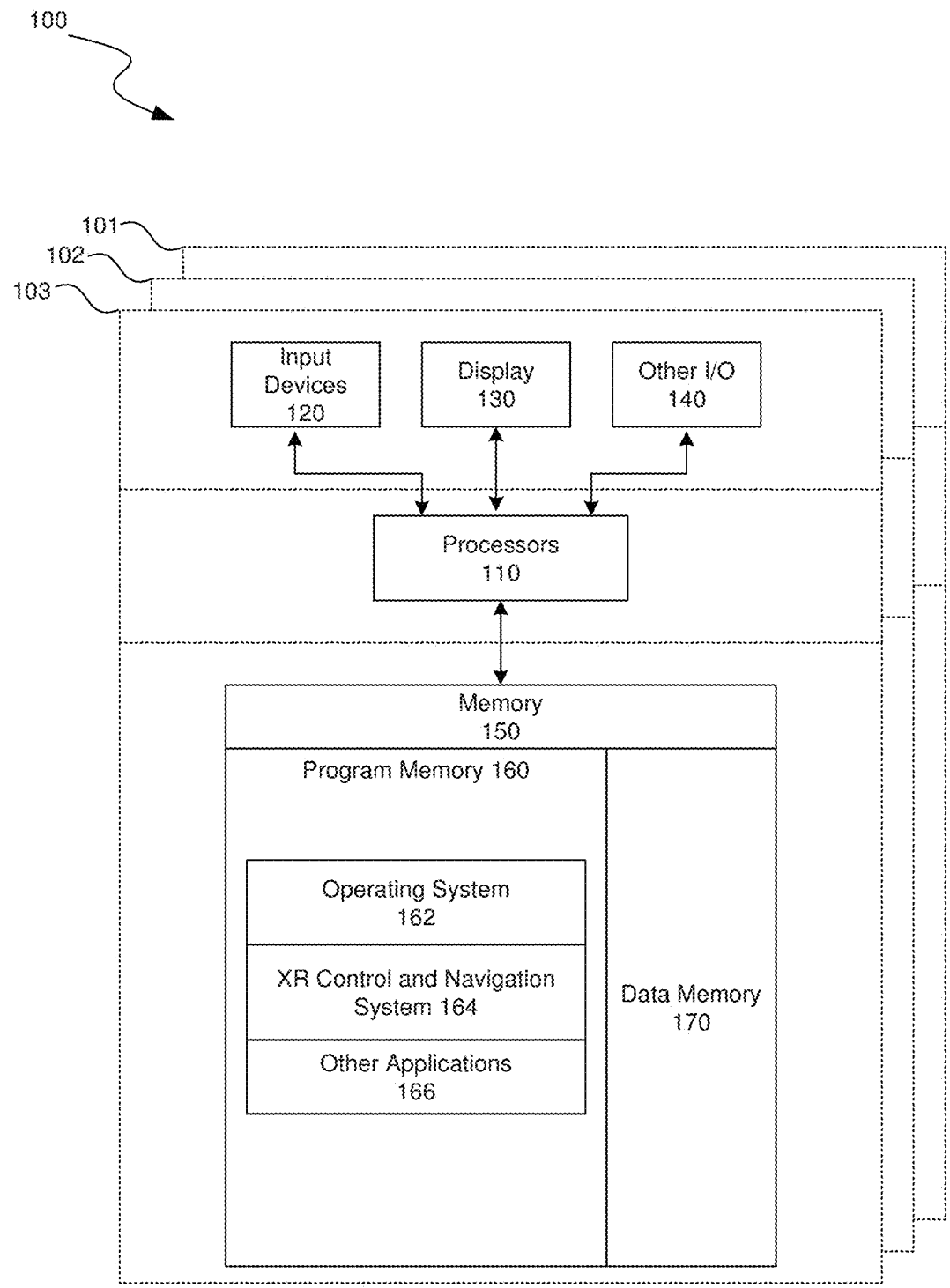
FIG. 1 is a block diagram illustrating an overview of devices on which some implementations of the present technology can operate.

Aspects of the present disclosure are directed to a virtual personal interface (herein "personal interface") for controlling an artificial reality (XR) environment, such as by providing user interfaces for interactions with a current XR application, providing detail views for selected items, navigating between multiple virtual worlds without having to transition in and out of a home lobby for those worlds, executing aspects of a second XR application while within a world controlled by a first XR application, and providing 3D content that is separate from the current world. The personal interface can be separate from a current virtual world, allowing it to appear consistently in multiple virtual worlds and to display controls from either the XR application in control of the current virtual world or elements and controls for other VR worlds, such as controls that enable virtual world selection and transport.

For instance, an XR system can define a platform for XR applications, where XR applications can each include a controller, a system for providing output in the personal interface and a system for providing a 3D world. For example, while a user is in a first virtual world, she can access the personal interface, and can navigate within the personal interface to the personal interface output for the XR application in control of the current world or the personal interface output from another XR application. This personal interface output from such another application in some cases is referred to herein as a 2D interface, but in some cases can include 3D content. The 2D interface can allow the user to teleport directly to one or more locations in a 3D world controlled by that other application. When such a teleportation control is activated, the 3D world building portion of the corresponding XR application can be activated to create that world into which the user is taken. That is, the personal interface can host a 2D interface from a personal interface builder of an application, where that 2D interface can enable teleportation to a 3D world and/or control of 3D content for a corresponding virtual world. In some cases, the personal interface builder and/or 3D world builder can cause the display of the 2D interface and/or 3D world through the orchestration of content either hosted by a server for a respective application and/or stored locally by the personal interface.

When a user desires to travel from a current to a subsequent virtual world, she can simply select a desired application on the personal interface (i.e., via the 2D interface from the personal interface builder of that application) and select a teleport control in order to be transported to the corresponding virtual world. In such a case, a current virtual world can be displayed concurrently with the personal interface, which can be providing the 2D interface from the selected other application, and until such time that the 2D interface is used to change the world via the corresponding 3D world builder of that other application. In some implementations, the personal interface can present, as part of a 2D interface for an application, various specific destinations within a corresponding virtual world to which a user can be directly transported. For example, such destinations can be designated by one or more travel cards implemented as deeplinks to places, events, or people within the respective virtual world. This way, the personal interface can facilitate traveling directly between virtual worlds in artificial reality. In response to selection of one of such links, the 3D world building portion corresponding to the selected application can responsively (i.e., be caused to) then construct a 3D world corresponding to the selected destination.

In some implementations, the personal interface can define various controls that can be applicable across each of the virtual worlds corresponding to applications. For instance, the controls can orchestrate avatar movement and/or appearance, navigation to a particular area within a virtual world, personal content available to be included in a virtual world, access to credit needed to transact payments, etc. In these ways, the personal interface can provide a full suite of controls that can be similarly applied no matter the virtual world in which a user is operating. Said alternatively, the personal interface can, by providing these controls universally across virtual worlds, bridge these spaces to allow them to be experienced in an unfettered manner from the perspective of a user.

As can be understood from the above, the personal interface can serve as an output medium for content sourced from an application corresponding to a current virtual world. In some implementations, however, the personal interface can also provide content sourced from an external application, i.e., content not specifically prescribed by or known to the application in control of the current virtual world. In some cases, the personal interface can even provide 3D content that is not under the control of the application controlling the current virtual world. In some cases, the personal interface can provide controls for augmenting a dedicated area of a virtual world with content from another application. For example, a virtual world can include a dedicated broadcast (e.g., casting) space (e.g., 2D or 3D area), the personal interface can coordinate providing a deeplink for that space to a third party application, which can then cast its content into the dedicated space. As a result, a user can select a content provider (i.e., the third party application) on the personal interface that can then cause content to be relayed to the dedicated broadcast space.

In some implementations, the personal interface can, for other user-selected items in a virtual world, display various corresponding content. For example and where a selectable item is selected by a user and deeplinked to a controller for that item (e.g., a same application as the application for the virtual world being traveled, another application, a system controller such as a people profile manager or social graph module, etc.), the personal interface can access that deeplink to obtain and display the corresponding content from the controller. This way, a user can explore the corresponding content to, for instance, learn additional information about the selected item.

In some implementations, the personal interface can generate 3D content that is exclusive of (i.e., not controlled by) an application for a current virtual world in which a user is traveling. To do so, the 2D interface in control of the personal interface can react to a 3D content trigger action of a user to cause the personal interface to access and display 3D content for the action. Exemplary content trigger actions can include user proximity to or selection of a particular item in a virtual world, a gaze or stare at a particular item in a virtual world or on the personal interface, selection of an item on the personal interface, navigating a website in a virtual world, presence in a virtual world that is detected by its controlling application (to provide content designated by the application), selecting one or more personal content items that a user desires to include in a virtual world, etc. In response to receiving the 3D content trigger action, the personal interface can display corresponding 3D item content in a vicinity of the personal interface, the personal interface can become a window into another virtual world, or the personal interface can provide portal for a volume extending through the personal interface and enabling the user to see and interact with 3D content provided in the volume but may not be under the control of the application corresponding to the current virtual world. In these ways, the personal interface can offer a user an opportunity to preview an item for the 3D content trigger action that can serve to initially inform the user about the item or enhance already existing knowledge, without that 3D content being provided through or accessible by the application in control of the current virtual world. In some cases, the type of preview that the personal interface can provide (vicinity, window, portal) can be a function of the item and its controller (e.g., a corresponding application). This way, the personal interface can optimize the scope and degree to which informative information for the item can be conveyed to a user.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing manners of presenting, navigating, and controlling virtual worlds in artificial reality provide discrete avenues for determining and reaching those worlds. For example, the worlds can be targeted for access and manipulation only through transfer through a home lobby. That is, the home lobby can be akin to a mental switch that redirects a user to a subsequent virtual world from a currently world being traveled only after transitioning through the lobby. In these ways, the home lobby presents an obstacle to being able to seamlessly navigate worlds for items of interest in the current world and otherwise. That is, travel between virtual worlds in artificial reality has required a user to transition between those worlds via a home lobby where a current world is closed and a new one is opened. In other words, seamless movement between worlds not involving this transitioning step has eluded presently available architectures. As a result, the corresponding artificial reality experience can be unnecessarily frustrating, distracting, and time-consuming. By contrast, implementations of the present technology offer a user an ability to uninterruptedly transition to between virtual worlds, whether or not associated with a particular item of interest. That is, such uninterrupted transition can, for instance, provide the user the ability to retain a mental association for prior and future virtual worlds. For instance, the applicable transition can be enabled by a deeplink for the interested item that can allow a user to directly travel to a virtual world. Accordingly, such instances of direct travel can be programmatically formulated to enhance travel between virtual worlds so as to enable a user of an artificial reality navigation system to, unlike existing systems, specifically remember relative associations for virtual worlds and items contained within/defined for those worlds. Further, implementations of the present technology can, by enabling such direct travel, conserve system resources (e.g., battery power) and reduce processing time for an artificial reality system since it is unnecessary to load, store, and access a home lobby.

Another way in which implementations of the present technology are unlike existing systems includes an ability to provide increased security for user content via a personal interface runtime that operates independently of any application in control of a virtual world. As a result, the risk of access to user content and potential manipulation of such content (e.g., credit cards, inventory items, etc.) by such an application is substantially eliminated.

Yet another way in which implementations of the present technology improve upon existing artificial reality systems includes the ability to provide multiple avenues for the introduction and display of 3D content, thus demonstrating increased usability and flexibility over those current systems. For instance and whereas existing systems are limited to providing 3D content merely from a single application at any given time, the present technology can provide 3D content via the personal interface as well as from an application that is external to a current virtual world (e.g., a casting application).

Still further, implementations of the present technology can enable direct access to content that can be shown in the personal interface. For example, the current implementations can provide a system of deeplinks between selectable entities and corresponding controllers, thus allowing third-party systems to provide contextual and control information without requiring a user to filter through another external system to access and obtain that information.

Several implementations are discussed below in more detail in reference to the figures. FIG. 1 is a block diagram illustrating an overview of devices on which some implementations of the disclosed technology can operate. The devices can comprise hardware components of a computing system 100 that enables controlling an artificial reality (XR) environment, such as by providing user interfaces for interactions with a current XR application, providing detail views for selected items, navigating between multiple virtual worlds without having to transition in and out of a home lobby for those worlds, executing aspects of a second XR application while within a world controlled by a first XR application, and providing 3D content that is separate from the current world. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (H P Us), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, artificial reality (XR) control and navigation system 164, and other application programs 166. Memory 150 can also include data memory 170 that can include, e.g., virtual world location data, virtual world item location data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
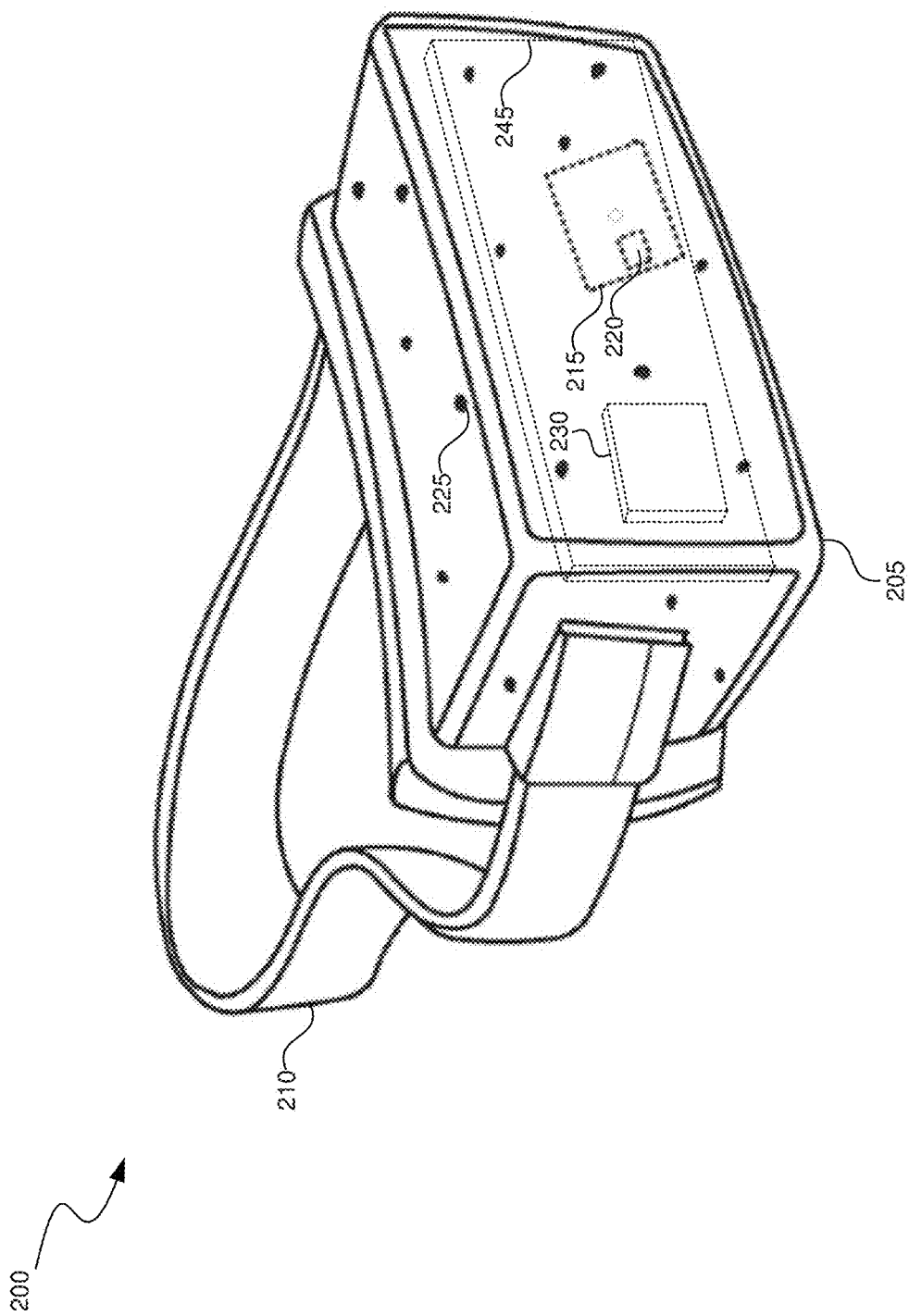
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points.

Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
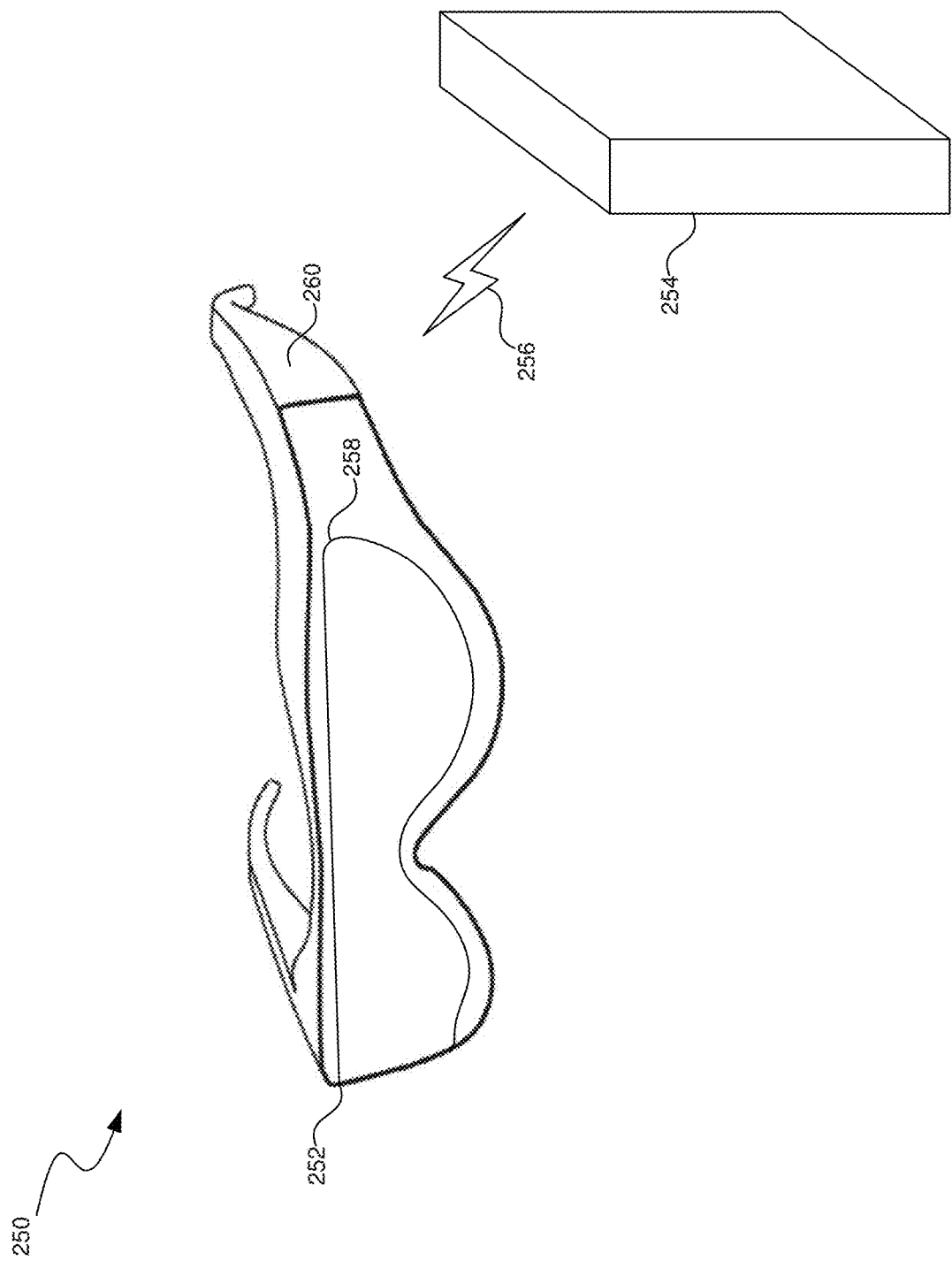
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
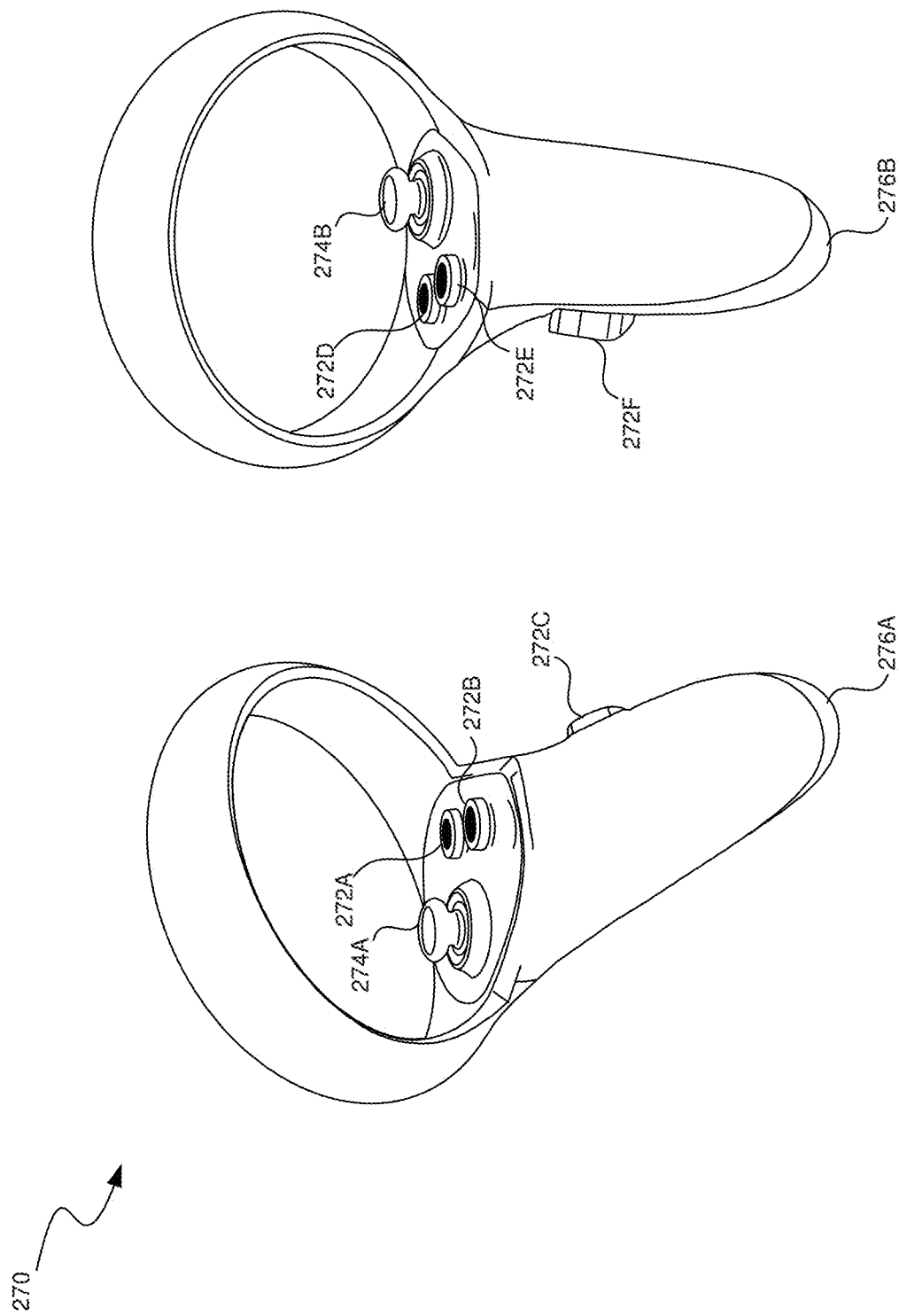
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
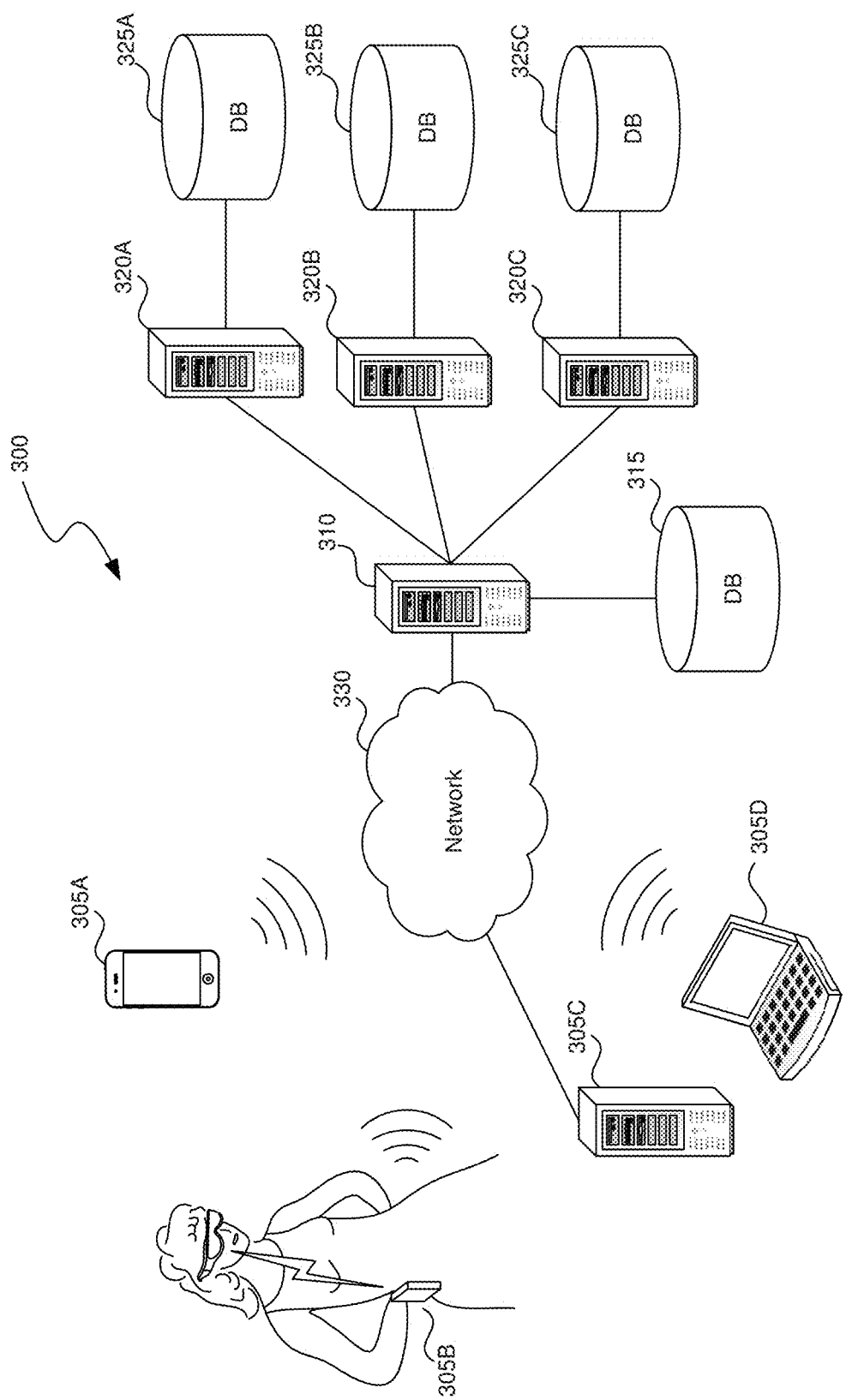
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
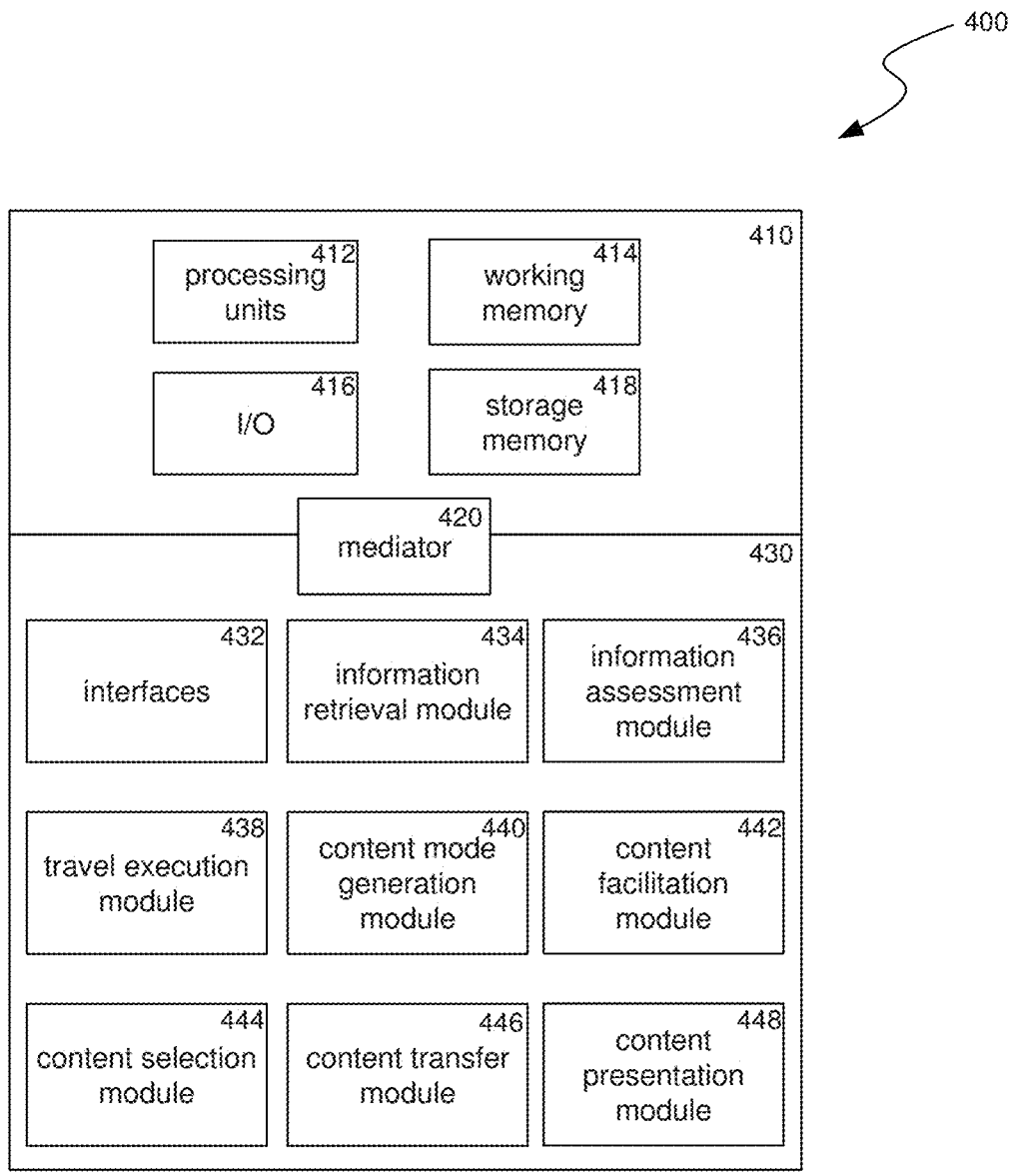
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for controlling an artificial reality (XR) environment, such as by providing user interfaces for interactions with a current XR application, providing detail views for selected items, navigating between multiple virtual worlds without having to transition in and out of a home lobby for those worlds, executing aspects of a second XR application while within a world controlled by a first XR application, and providing 3D content that is separate from the current world. Specialized components 430 can include an information retrieval module 434, an information assessment module 436, a travel execution module 438, a content mode generation module 440, a content facilitation module 442, a content selection module 444, a content transfer module 446, a content presentation module 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some implementations, information retrieval module 434 can retrieve information (i.e., "data") which can be used to activate the personal interface. For instance, such data can include gestures, utterances, and other activity of a user while traveling within a virtual world. In some implementations, information retrieval module 434 can retrieve a user selection of an XR application corresponding to a virtual world to which the user desires to travel, including specific destinations for that world. In some implementations, information retrieval module 434 can, for a virtual world, retrieve data corresponding to user actions or spaces with which a user interacts. Such data can be in regard to a selection of a particular item (e.g., an object, a person, a dedicated broadcast space), a stare at a particular item in the virtual world or on the personal interface, a selection of a control on the personal interface, a conversation with an individual in a virtual world, etc. Further, information retrieval module 434 can retrieve data for a 3D content trigger action that can cause the personal interface to display 3D content exclusive of the virtual world being traveled by a user. In such a case, a non-exhaustive list of trigger actions can include user proximity to or selection of a particular item in a virtual world, a gaze or stare at a particular item in a virtual world or on the personal interface, selection of an item on the personal interface, navigating a website in a virtual world, presence in a virtual world that is detected by its controlling application (to provide content designated by the application), and selecting one or more personal content items that a user desires to include in a virtual world. Additional details on retrieval of the above types of data are provided below in relation to blocks 602, 604, and 608 in FIG. 6, block 702 in FIG. 7, block 802 in FIG. 8, and block 902 in FIG. 9.

In some implementations, information assessment module 436 can perform specific assessments as regards travel to a virtual world and actions within that world. For instance, information assessment module 436 can assess which XR application corresponding to a virtual world a user has selected for travel, as well whether the user has selected a particular travel destination designated for that virtual world. In some implementations, information assessment module 436 can assess types of 3D content trigger actions that a user has taken within a virtual world and which can cause the generation of 3D content on the personal interface. Additionally, information assessment module 436 can evaluate, for a virtual world, a type (e.g., 2D or 3D) of broadcast space within a virtual world that can be dedicated for displaying or otherwise presenting content for the virtual world. Additional details on the assessments performed by information assessment module 436 are provided in relation to blocks 604 and 608 in FIG. 6, block 802 in FIG. 8, and block 902 in FIG. 9.

In some implementations, travel execution module 438 can execute travel to a particular destination (e.g., a place, event, or one or more individuals) within a virtual world. For example, the travel can be executed according to a user's selection of a travel card presented by a XR application corresponding to a virtual world in response to the user's selection of that application on the personal interface. Additional details on the types of travel that can be executed by this module are provided in relation to block 608 in FIG. 6.

In some implementations, content mode generation module 440 can determine a particular mode in which content ought to be generated. For instance, content mode generation module 440 can, in a case in which the personal interface acts to generate 3D content exclusive of the world being traveled by a user, select how the 3D content should be presented to a user via the personal interface. In these regards, exemplary modes can include presentation of content according to a display option, e.g., in a vicinity of the personal interface, through a window provided in the personal interface, or through a volumetric space generated by the personal interface. In some cases, content mode generation module 440 can determine the particular mode as a function of the type of item which was the subject of a 3D content trigger action, e.g., based on a mapping of item types to display modes. In other cases, content mode generation module 440 can always use the same display mode. In yet other cases, the application in control of displaying the 3D content can further specify which display mode to use. Additional details on content mode generation performed by the content mode generation module 440 are provided in relation to block 804 in FIG. 8.

In some implementations, content facilitation module 442 can facilitate the processing of a particular type of content that can augment a virtual world traveled by a user. For example, such module can enable, for a selected virtual space within a virtual world traveled by a user, a transfer of 2D and/or 3D content to that space. In this regard, content facilitation module 442 can detect a deeplink associated with the space. Once detected, content facilitation module 442 can then transfer that link to the personal interface, for instance, such that a user can then make selections for an application corresponding to a content provider that can deliver content to the selected virtual space. Additional details on the content facilitation that can be performed by the content facilitation module 442 are provided in relation to blocks 904 and 906 in FIG. 9.

In some implementations, content selection module 444 can execute the selection of content processed according to operation(s) of content facilitation module 442. That is, content selection module 444 can receive 2D interface selections of the personal interface, for an application on the personal interface, that can provide content that can augment a virtual world. Additional details on content selections performed by content selection module 444 are provided in relation to block 906 in FIG. 6.

In some implementations, content transfer module 446 can transfer 3D content to change or augment a virtual world traveled by a user. An example transfer can be directed to content of a XR application corresponding to a virtual world to which the user desires to travel. Another example transfer can be directed to content to filled in a virtual space from a content provider whose content was facilitated by content facilitation module 442. Additional details on transfers of 3D content performed by the content transfer module 446 are provided in relation to block 610 in FIG. 6 and block 906 in FIG. 9.

In some implementations, content presentation module 448 can present 3D content according to a user selection for a XR application corresponding to a virtual world or a 2D application which can augment content for that world. Additional details on presentations of content performed by the content presentation module 448 are provided in relation block 610 in FIG. 6, block 706 in FIG. 7, block 806 in FIG. 8, and block 906 in FIG. 9.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
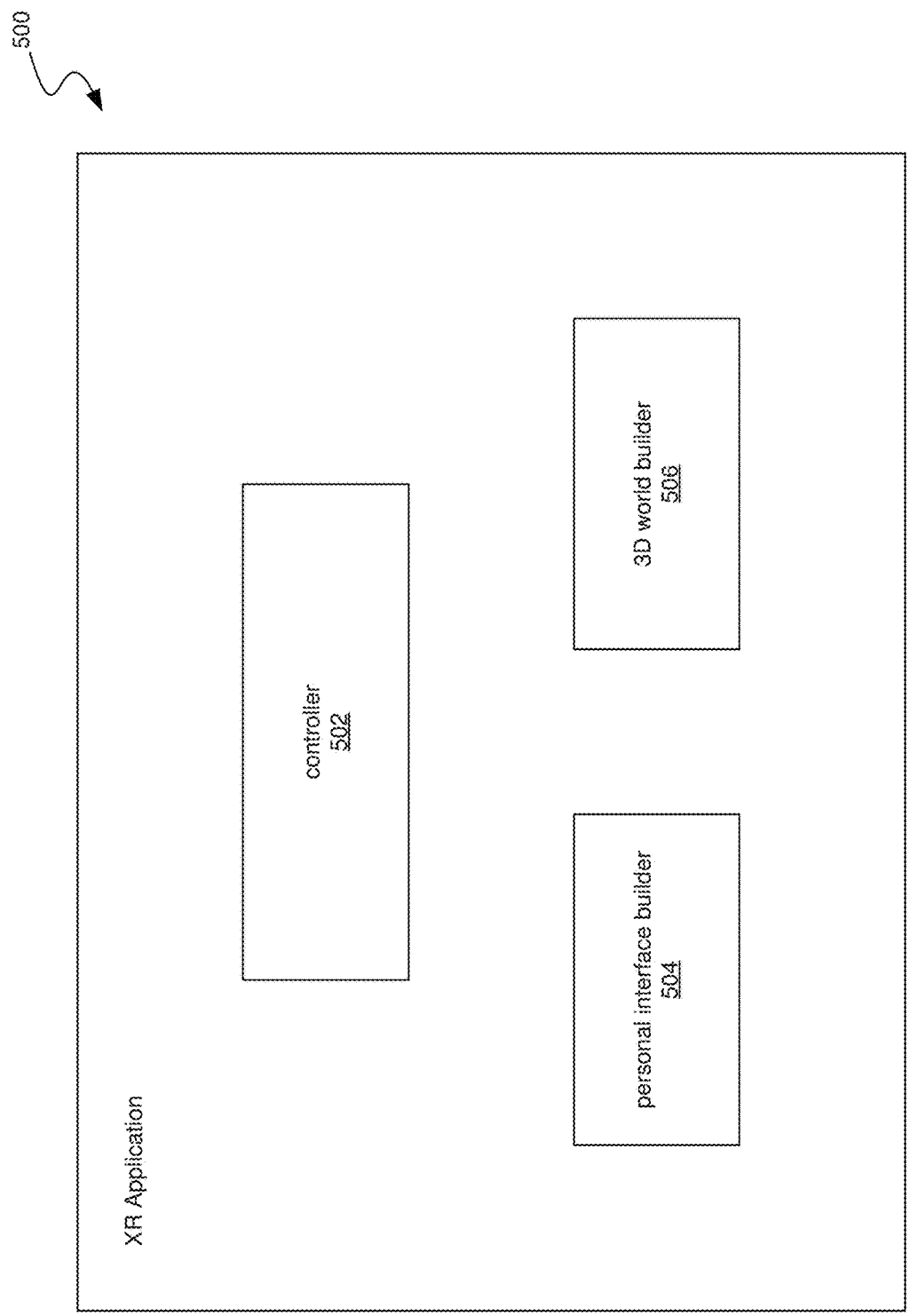
FIG. 5 is a conceptual block diagram illustrating an exemplary artificial reality (XR) application which, in some implementations, can be used to separately generate and control personal interface and 3D world content.

FIG. 5 is a conceptual block diagram illustrating an exemplary artificial reality (XR) application 500 which, in some implementations, can be used to generate 2D interfaces for display via a personal interface and control 3D content for a corresponding virtual world in artificial reality. Therein, application 500 includes a controller 502, a personal interface builder 504, and a 3D world builder 506. In operation, an XR system can include multiple runtimes (runtime systems or environments), one controlled by a currently active application defining the current virtual world and one that is the personal interface. While the personal interface can be a virtual object in the 3D world with properties such as a size, reactions to physics, display properties, etc., what the personal interface displays can be a separate runtime from the virtual world. This separation between the virtual world and the personal interface provides an ability for an active application to output a 3D world while the user has access to features of other XR applications, such as travel cards to teleport directly into another virtual world. In various implementations, the personal interface execution environment can be hidden from the active application or can have access ports that the application executing on the personal interface can control to surface only desired information to the active application. Thus, XR applications can be conceptually divided into general control and access functions in controller 502, a personal interface builder 504 module that executes under the personal interface runtime to provide a 2D interface on the personal interface, and a 3D world builder module 506 which executes under a world runtime to generate the current 3D world. A such, the 3D world builder 506 of an XR application is only active when that XR application is generating a current 3D world (or in some cases when a window in that world is needed) while the personal interface builder 504 can be executed when the XR application is the current active application or when the XR application is selected in the personal interface when another application is the current active application.

Controller 502 can include all necessary coding and programming for coordinating operations of personal interface builder 504 and 3D world builder 506. For example, controller 502 can include APIs, e.g., for responding to deeplink activations, triggering personal interface builder 504 to generate 2D interfaces, or triggering 3D world builder 506 to generate a 3D world. Personal interface builder 504 can respond to an activation, received via controller 502, of the application on a personal interface. That activation can cause the personal interface builder 504 to generate a 2D interface portion of the XR application that can, e.g., control traveling to locations in a virtual world of the application, access features in a current virtual world such as user preferences, social activities, using accessories, etc. When a user of XR control and navigation system 164 uses the 2D interface from personal interface builder 504 to travel to a location in a corresponding world, 3D world builder 506 can cause, i.e., via communications performed through controller 502, that virtual world to load. In various cases, personal interface builder 504 and/or 3D world builder 506 can build the 2D interface and 3D world using local content and/or content retrieved from a remote source. For example, a 3D world can include a number of 3D models (e.g., trees, buildings, etc.) which can be manipulated by multiple users in that 3D world. These 3D models can be stored locally or retrieved from a server while the representations of the other users and their states can be synchronized with such a server. As another example, personal interface builder 504 can have templates that are filled with locally stored content or live content retrieved from a server.

In some implementations, personal interface builder 504 can itself generate 3D content that can be displayed via the personal interface according to a display option for one or more items corresponding to the content. In this way, the personal interface, which can be a 2D application having corresponding 2D interfaces to XR and other applications, can host and display content, separately from the virtual world. Thus, the personal interface can serve as an output medium for an XR application in two distinct ways. First, the personal interface can be a vehicle by which to simply present 2D interfaces for applications e.g., enabling a user to travel among and interact with multiple virtual worlds corresponding to those applications. In this case, 3D content is under the control of the XR application corresponding to a virtual world traveled by a user and generated external to the personal interface. Second, the personal interface can be a vehicle by which 3D content for an XR application is generated and displayed by the personal interface itself. Such 3D content can be exclusive of a virtual world being traveled by a user. This way, a user can, for instance, "preview" one or more aspects of a given virtual world via the personal interface without having to actually go to that virtual world.

Figure 6:
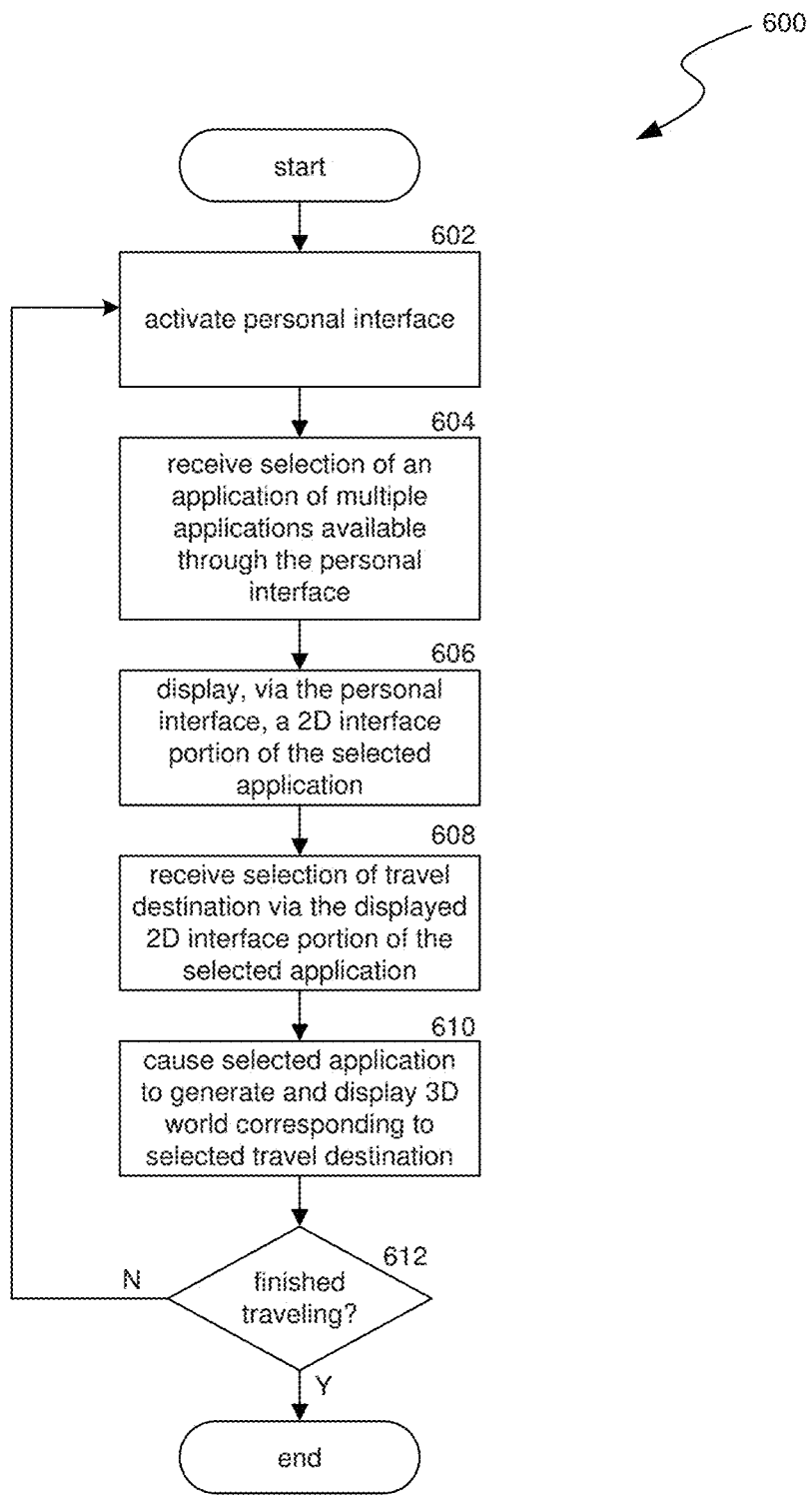
FIG. 6 is a flow diagram illustrating a process used in some implementations of the present technology for using a personal interface of an artificial reality (XR) navigation system to directly navigate between multiple virtual worlds.

FIG. 6 is a flow diagram illustrating a process 600 used in some implementations of the present technology for using a personal interface of the XR control and navigation system 164 to navigate multiple virtual worlds in artificial reality. For instance, process 600 can be used to allow a user to travel, on the fly and interchangeably, between multiple virtual worlds in which acquaintances of the user are located. In some implementations, process 600 can be initiated by a user executing a program to create an artificial reality environment. In some implementations, process 600 can be performed on a server system in control of that artificial reality environment; while in some cases all or parts of process 600 can be performed on an artificial reality client device.

At block 602, a user of XR control and navigation system 164 can activate the personal interface to access one or more controls (e.g., avatar controls, content items which can be accessed, payment methods and accounts access, navigational tools, etc.) while traveling within a current virtual world. For instance, the personal interface can be activated and displayed to the user in response to the user making one or more gestures, series of movements, utterances, activating a UI element, etc. In some implementations, a user can activate the personal interface using one or more of these prompts for activation to display the personal interface for the purpose of traveling to a subsequent virtual world directly from a current virtual world.

In some cases, when the personal interface is activated, it can display a 2D interface for the currently active application (i.e., the application in control of the current virtual world the user is in). At block 604, process 600 can receive a selection of another XR application from among multiple XR applications available through the personal interface. In this regard, the selected XR application can represent a subsequent virtual world with which the user wishes to interact and/or to which the user desires to travel seamlessly from the current virtual world. For making the selection of the XR application, process 600 can present the user a list of applications in which the applications can be stored locally on the personal interface and/or application shells that process 600 has selected as being of interest to the user and whose components can be downloaded upon selection. To facilitate the selection, process 600 can configure the applications to be searchable and/or organized according to a predetermined form of ranking (e.g., most used).

At block 606, process 600 can display, via the personal interface, a 2D interface portion of the selected application. For instance, the displayed 2D interface portion can be in control of a 2D interface of the personal interface so as to output content corresponding to the selected application. During such control, such 2D interface portion can be operative according to the runtime of the personal interface so as to not be under any control of a controller of a current virtual world, i.e., the 2D interface portion can be operating under its own authority when content for the selected application is displayed. In some implementations, the content corresponding to the selected application that is displayed can include, for example, information regarding the source of the selected application (e.g., its origin), the type of virtual world that such application corresponds to, a listing of travel cards that can enable a user's travel to a particular destination within a corresponding virtual world, a listing of occupants for the corresponding virtual world, avatars that will be made available to the user upon arrival in the virtual world, etc.

At block 608, process 600 can receive a selection of a travel destination via the displayed 2D interface portion of the selected application. For example, the 2D interface portion can present the user multiple travel cards for a subsequent virtual world corresponding to the application, where the travel cards can indicate destinations including places (museums, schools, resorts, etc.), events (sporting competitions, musical performances, parties, etc.), and people (friends, family members, supervisors, etc.), within the world. In this respect, the travel cards can have corresponding deeplinks such that a user can travel directly to a respectively associated destination. In these regards, the travel cards can be originated (i.e., defined by) one or more of the following, such as natively by the selected application, as a result of scheduling for certain events for the subsequent virtual world (e.g., timing for a sporting or musical event), according to membership or presence in that world (e.g., a user's friends, celebrities, user's with special status in the world), when another user designates a location in that world as being of interest, etc. In some implementations, particular aspects that can be included in a travel card can include one or more of an avatar selection that a user will be provided upon arrival in a subsequent virtual world, a description for a particular event and its start time, for instance, activities for a subsequent virtual world, people that a user can join in such a world, etc.

At block 610, process 600 can cause the selected application to generate and display 3D content for the subsequent virtual world that corresponds to the selected travel destination. As an example, if the subsequent virtual world includes a building having several rooms and the selected travel destination corresponds to a particular one of those rooms, process 600 can generate a representative 3D depiction for that room. In this respect, it can be understood that process 600 can cause generation of the room in 3D format according to operations of and between controller 502 and 3D world building portion 506. In some implementations, process 600 can generate 3D content for a virtual world corresponding to selected travel destination (such as the above room) from elements stored locally on the personal interface or otherwise (i.e., from a remote server). In some implementations, process 600 can generate 3D content for such a virtual world where, for an exemplary multi-person environment, one or more states of displayed objects can be synchronized between users in that world (e.g., through one or more host servers for the world).

At block 612, process 600 can return to block 602 to initiate travel for yet another subsequent virtual world in a case in which a user has not finished traveling among virtual worlds in artificial reality. In a case in which the personal interface is still activated, i.e., not dismissed by a user according to or more prompts similar in type but different in, for example, number or sequence than those enabling activation, it is contemplated that the user can merely tap the personal interface to awaken it. That is, XR control and navigation system 164 can configure the personal interface to execute a sleep mode after a predetermined period of inactivity in order to decrease distraction to a user while traveling a virtual world.

Figure 7:
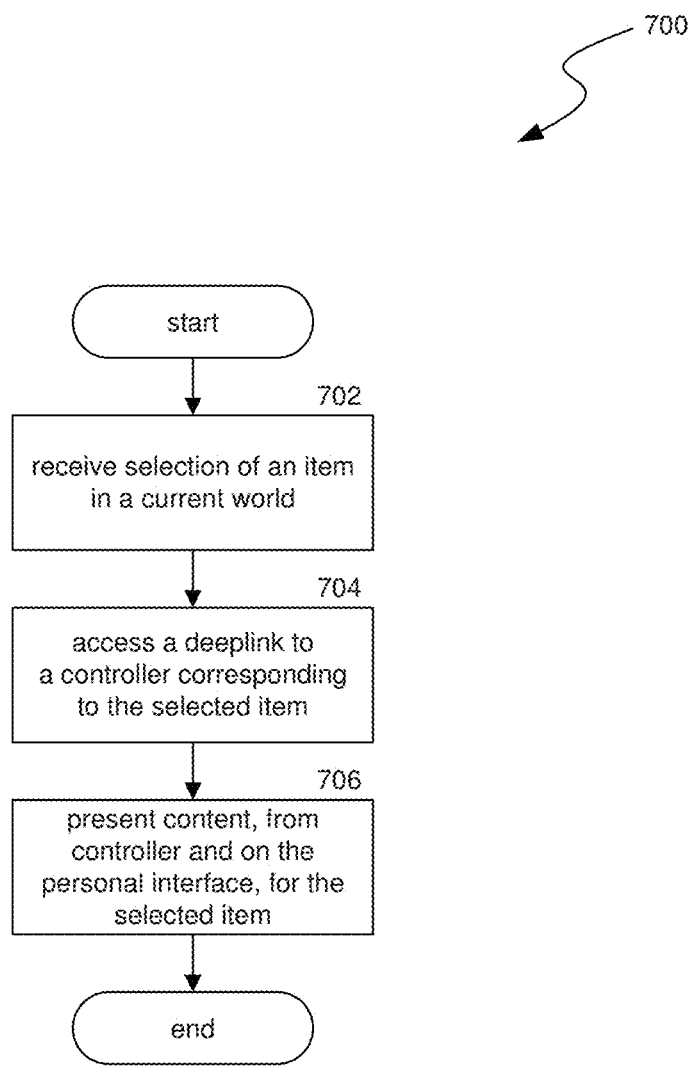
FIG. 7 is a flow diagram illustrating a process used in some implementations of the present technology for using the personal interface to present content from a controller corresponding to a selected item for a virtual world.

FIG. 7 is a flow diagram illustrating a process 700 used in some implementations of the present technology for using the personal interface to present content from a controller corresponding to a selected item. Process 700 can be initiated while a user is traveling within a virtual world corresponding to a selected XR application, and can be performed either on a server system in control of that XR application or on an artificial reality client device operating the selected XR application. For example, process 700 can, for an item in a virtual world being traveled by a user, present content for that item on the personal interface in real time. Such an item could be, for instance, a painting hung in a virtual world for a museum, where the presented content could include the name of the artist, a history of the artist, other paintings painted by the artist, etc.

At block 702, process 700 can receive a selection of an item, such as an item in a current virtual world being traveled by a user or an item selected through the personal interface. For example, the selection can be a result of the user interacting with (e.g., touching, gazing, etc.) the item, being in a predetermined proximity to the item, having traveled by the item a predetermined number of times within a certain interval of time, tapping the item when the item is displayed on the personal interface, speaking a command indicating the item, etc.

At block 704, process 700 can access a deeplink to a controller corresponding to the selected item. The deeplink can be included in a data structure for the selected item and can specify the destination controller and one or more parameters to pass to the controller (e.g., an identity of the selected item, an identity of the user, contextual information of the selection such as which virtual world it was in, who else is present, etc.). For instance, the deeplink can specify the destination as a module or function call in a current application, another local XR application, a URI for a remote service, etc. In some cases, the controller can correspond to the application for the current virtual world being traveled by the user. In other cases, the controller can correspond to an external local or remotely served application, i.e., an application separate from an application in control of the current virtual world. In some implementations, the controller can correspond to a system component mapped to the selected item, such as a people profile manager, a social graph module, or a contacts module mapped to a people-type item; a file picker mapped to a media player type item, a digital wallet mapped to a payment portal type item; a scheduling manager defining availability for certain areas within the current virtual world; etc. In some cases, the selected item can be an area of a virtual world, and at block 704, process 700 can access the controller deeplink as a result of the user entering that area. When process 700 accesses the deeplink corresponding to a selected item, process 700 can provide via the personal interface runtime a request to the controller for corresponding information to display in the personal interface, where the request can specify, e.g., the specified parameters for the selected item.

At block 706, process 700 can receive the requested content, from the controller of the selected item, and can display that content on the personal interface. There are no limits on the type of the content that can be provided, but examples include a details page for the selected item, the user's notes on the selected item, the 2D interface of the XR application that is the controller for the selected item, a default page provided by a system component providing meta-data from the selected item, another 3D model, a view into another virtual world, etc.

Figure 8:
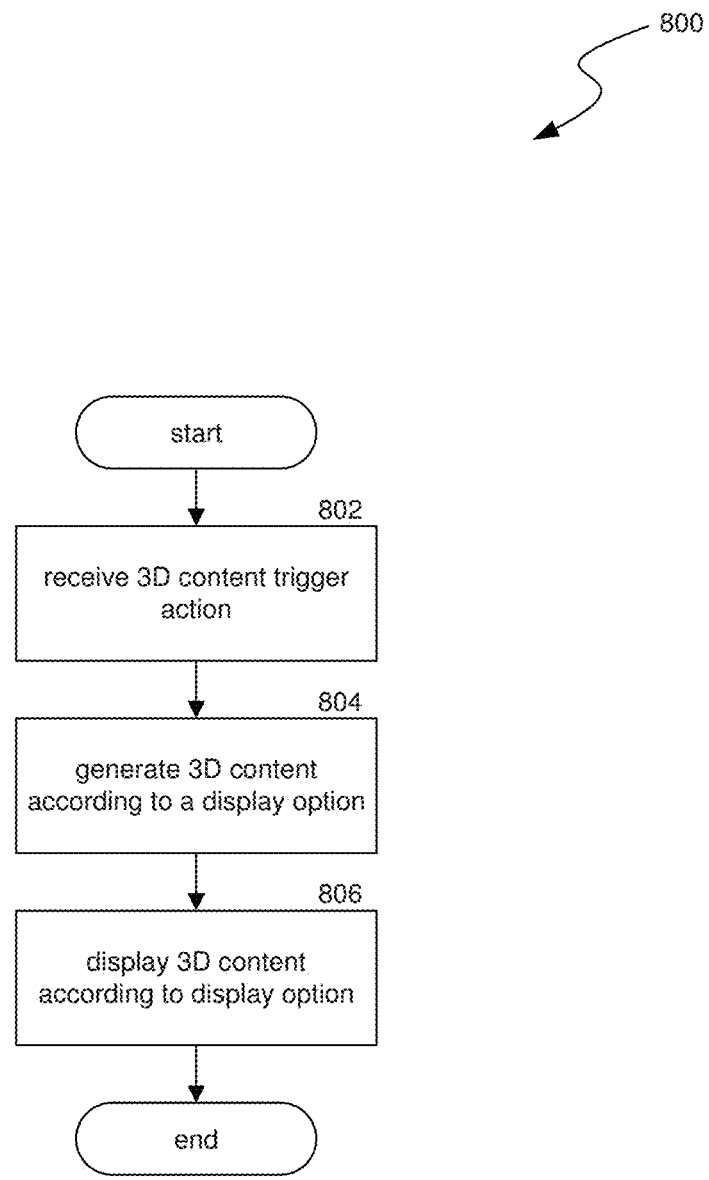
FIG. 8 is a flow diagram illustrating a process used in some implementations of the present technology for generating and displaying 3D content via the personal interface.

FIG. 8 is a flow diagram illustrating a process 800 used in some implementations of the present technology for generating and displaying 3D content via the personal interface. Process 800 can be initiated while a user is traveling within a virtual world. Process 800 can be performed on an XR device or, in some cases, can be performed on a server system supporting such an XR device where operations such as "displaying 3D content" are to be understood as causing display of such content on the XR device. For instance, process 800 could generate and display 3D content, via the personal interface, for the painting discussed in relation to FIG. 7.

While a user is traveling within a current virtual world, process 800 can, at block 802, receive one or more 3D content trigger actions. Such trigger actions can be, for a user's activity within the current virtual world, actions and/or context that the XR control and navigation system 164 has mapped to display corresponding 3D content in the virtual personal interface runtime. For example, the content trigger actions can include user proximity to or selection of a particular item in a virtual world, a gaze or stare at a particular item in a virtual world or on the personal interface, selection of an item on the personal interface, navigating to a website in a virtual web browser, presence in a virtual world that is detected by its controlling application (to provide content designated by the application), selecting one or more personal content items that a user desires to include in a virtual world, selection of an item where a corresponding deeplinked controller provides 3D content in response (as discussed above in relation to FIG. 7), etc.

At block 804, process 800 can generate 3D content according to a display option. In particular, process 800 can generate such 3D content in the runtime of the personal interface, where the generated content may not be accessible to, or under the control of a respective application that is in control of the current virtual world. The generated content can relate to an item which was the target or subject of a given 3D content trigger action. For example, if a user was in proximity to an advertisement in the current virtual world, corresponding generated content can be sourced by an application under the control of an associated advertiser. In this regard, it can be understood that a personal interface builder (see personal interface builder 504 of FIG. 5 and accompanying discussion) of the sourcing application can provide 3D content to the personal interface as part of the content generation according to block 804—which may be triggered by a deeplink activation to the sourcing application as discussed in relation to FIG. 7. Depending upon a nature of the content to be generated, process 800 can generate that content in accordance with a particular display option, i.e., a way that the controlling application prescribes display for the item relative to the personal interface. In various implementations, the system may only allow one display option, the display option may be set by the content provider or set as meta-data on the content, or there may be a mapping of content types to display options. The display options that can be executed by the personal interface can include displaying the generated content in a vicinity of the personal interface, through the personal interface acting as a window to another virtual world, or through a portal (e.g., a volume) extending through the personal interface and through which the item can be accessed by a user. For example, where the content is a 3D model of below a certain size, the portal display option may be used, where the content is a 3D model of above the certain size, the vicinity display option may be used, and where the content is a link to another virtual world the window display option may be used.

At block 806, process 800 can display the generated content according to the corresponding display option. This way, process 800 can provide the personal interface as an output medium for the 3D content in a manner which is not under the control of or in any way disrupts display of the current virtual world being traveled by a user.

Figure 9:
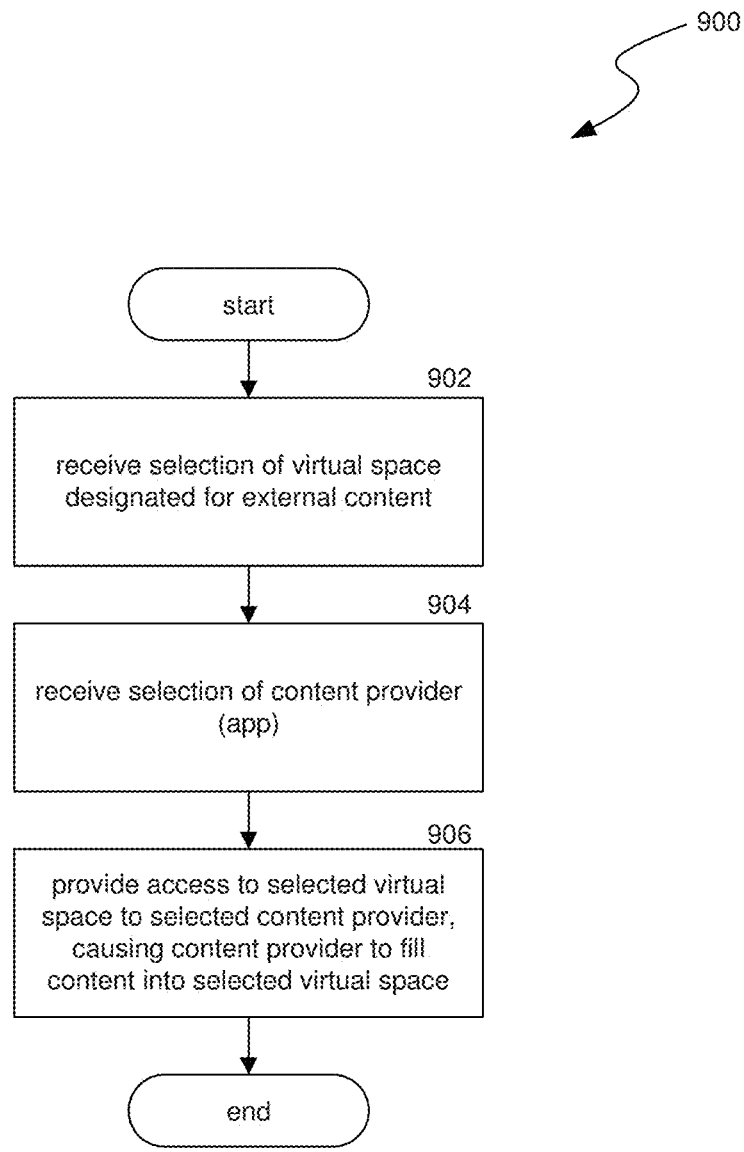
FIG. 9 is a flow diagram illustrating a process used in some implementations of the present technology for populating a dedicated space within a virtual world with content sourced by an application external to that virtual world.

FIG. 9 is a flow diagram illustrating a process 900 used in some implementations of the present technology for populating a dedicated space within a virtual world with content sourced by an application external to that virtual world. Process 900 can be initiated while a user is traveling within a virtual world corresponding to a selected XR application, e.g., process 900 can be available as part of an interface between a virtual world and the personal interface where access to designated spaces in the virtual world cause selection for those spaces in the personal interface or conversely where content selected via coordination in the personal interface can then be provided to access a designated space in the virtual world. Process 900 can be performed on an XR device such as in a runtime of a personal interface. In some cases, process 900 could be performed on a server system in control of such an XR device. In these regards, and for example, process 900 can populate a dedicated movie screen within a virtual world with content for a movie selected by a user from a listing of movies provided to the user according to an application stored on a personal interface.

At block 902, process 900 can receive a selection of a virtual space, within a current virtual world being traveled by a user, that is designated for external content. In this regard, the virtual space can be, for example, a 2D and/or a 3D space. For example, such a designed space, selected by a user for displaying a movie, can be configured to emit video and/or audio content. Such a virtual space can be associated to a deeplink representing an addressed location for the virtual space.

At block 904, process 900 can receive a selection of the provider of content which is to be output for the designated virtual space. For example, the selection can be the result of a user choosing, on the personal interface, a particular external application of a content provider that provides content that the user desires to be output to the designated virtual space. Alternatively, the designated virtual space can be assigned to a particular content provider such that when a user selects the virtual space (as at block 902), the content provider is pre-selected. In some implementations, the selection can be of a particular 2D or 3D content item the user wants to have shown in the designated virtual space.

In some implementations, process 900 can be performed such that first a user selects a content item in block 904, then selects a virtual space designated for external content. For example, a user may select a video and then a control which brings up a list of dedicated virtual spaces in the area that supports playing external videos. As another example a user may select a 3D model and then a control which brings up a list of dedicated volumes in the area that are large enough to hold the selected 3D model or that are designated to hold the type of the selected 3D model.

At block 906, process 900 can provide access to the selected virtual space to the selected content provider, where the providing of the access causes the content provider to fill content into the selected virtual space. A selection of a content provider can cause the deeplink for the dedicated space to be issued to the content provider, which allows the content provider to access the dedicated space and display content there. For example, the deeplink can be an address or ID for a virtual casting screen that a streaming video content provider can then use to output streaming video. In these regards, the content provider can fill the selected virtual space with 2D and/or 3D content, i.e., if the space includes a 3D capacity, the provider can further fill the space with corresponding 3D content.

Figure 10:
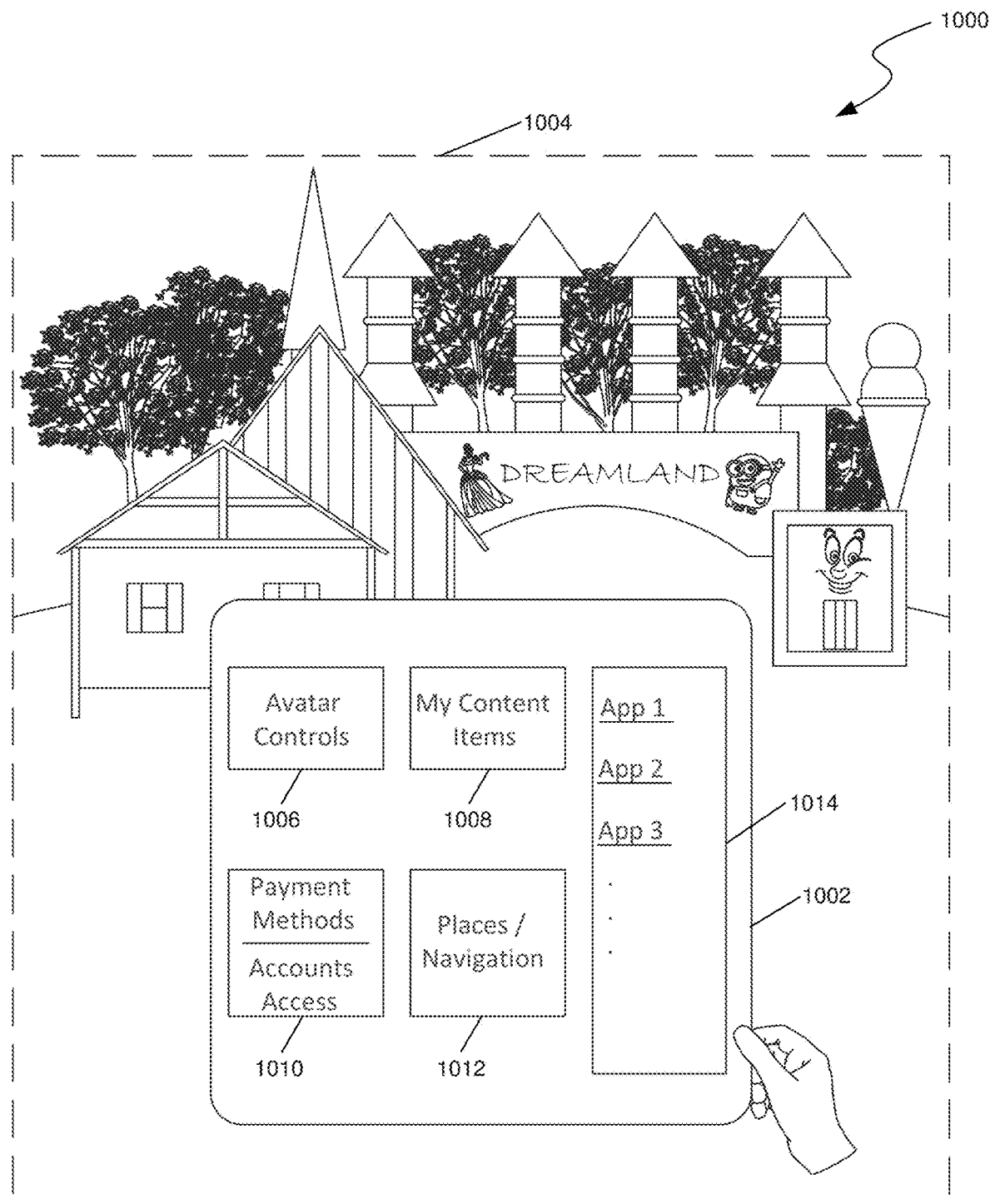
FIG. 10 is a diagram illustrating an exemplary personal interface.

FIG. 10 is a diagram 1000 illustrating an exemplary personal interface 1002. As can be understood from the discussion thus far, the personal interface can provide an interface such as various 2D or 3D components application, that can present 2D interfaces for applications, system controls, user preference settings, etc. That is, some of the interfaces in the personal interface can be 2D interface portions from an XR application (e.g., built by personal interface builder 504 of FIG. 5). The personal interface can include a 2D interface for an application controlling the current virtual world (e.g., elements 1006,1008,1010 and 1012—allowing the user to interact with the current "Dreamland" virtual world 1004 through a uniform array of exemplary controls. As shown, such controls can include avatar controls 1006 enabling a user to control, for instance, motions of an avatar representing the user or other entity in a virtual world. In addition, such controls can include selections for content items 1008 (e.g., avatar apparel, avatar accessories, collectibles, etc.) that the user may desire to include within a virtual world, payment methods/accounts access 1010 as means to purchases goods and/or services, as well as navigational tools 1012 (e.g., a list of places in the current world the user may want to travel to, events occurring, bookmarked locations, etc.) enabling a user to maneuver and record experiences within a virtual world. To enable a user to travel seamlessly between virtual worlds in artificial reality, the personal interface can also present access to the 2D interfaces for multiple user-selectable XR applications, here shown in list 1014 corresponding to XR applications installed on the XR device that have corresponding virtual worlds.

Figure 11:
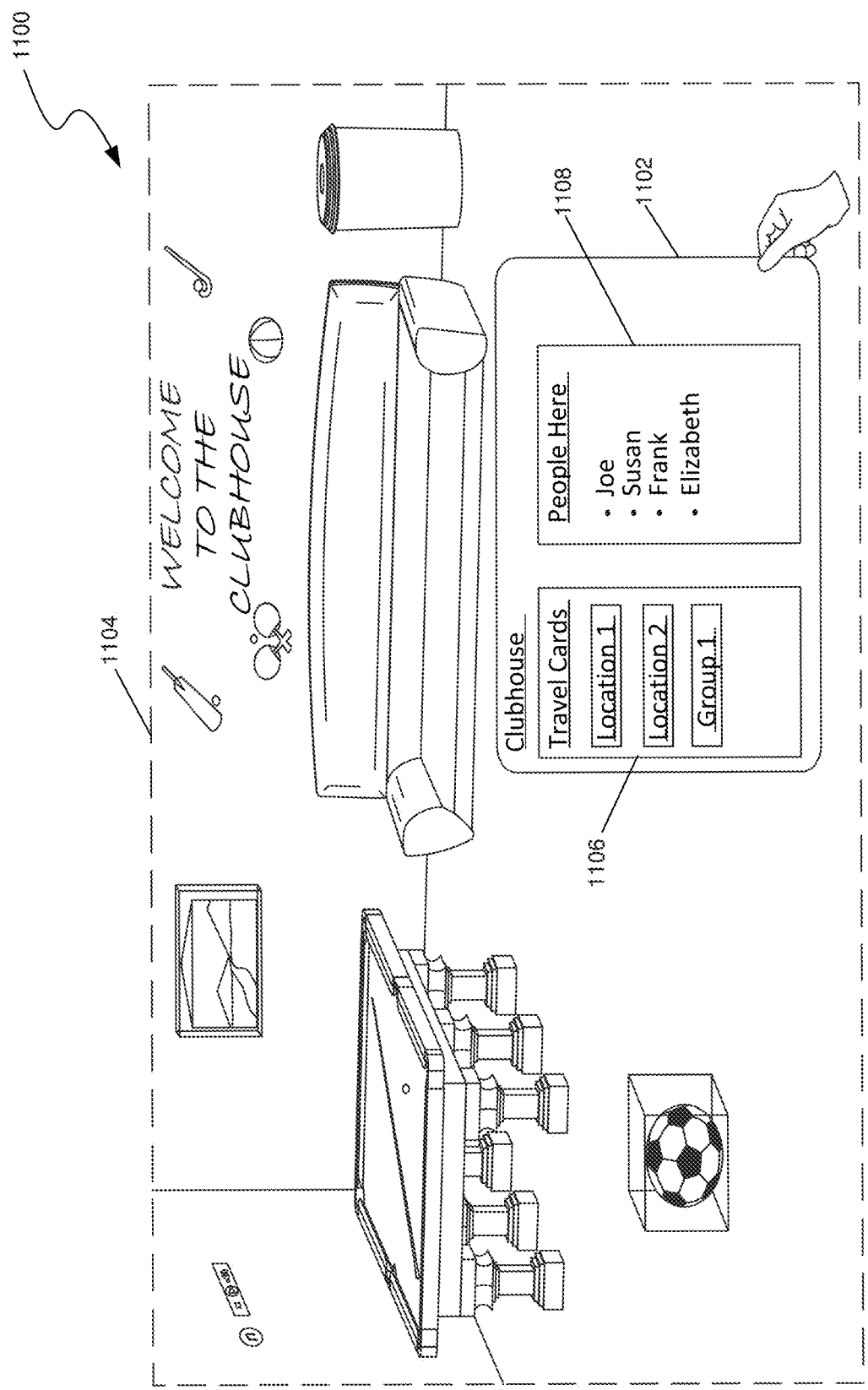
FIG. 11 is a diagram illustrating an exemplary personal interface depicting virtual world destinations which can be executable by a user upon selection of an XR application on the personal interface.

FIG. 11 is a diagram 1100 illustrating an exemplary personal interface 1102 depicting virtual world destinations which can be executable by a user upon selection of an artificial reality (XR) application on the personal interface 1102. For instance, in a case in which a user selects an XR application corresponding to the virtual world 1104 of "Clubhouse," personal interface 1102 can present a 2D interface for that XR application, which in this example includes user listings of destinations 1106 that a user can travel to within that world. That is, the destinations 1102 can be associated to deeplinks enabling a user to travel directly to a corresponding location. Exemplary destinations can correspond to locations within the world (e.g., places, events, such as Locations 1 and 2), and people or groups within the world (e.g., Group 1), such that a user can travel to join those people and share in the experience of a particular event (e.g., a concert). Additionally, in this example the 2D interface for the Clubhouse XR application includes occupants 1108 of the Clubhouse virtual world, which the user can select to, for instance, review a current location for an occupant, corresponding social media presence, and other types of public postings.

Figure 12A:
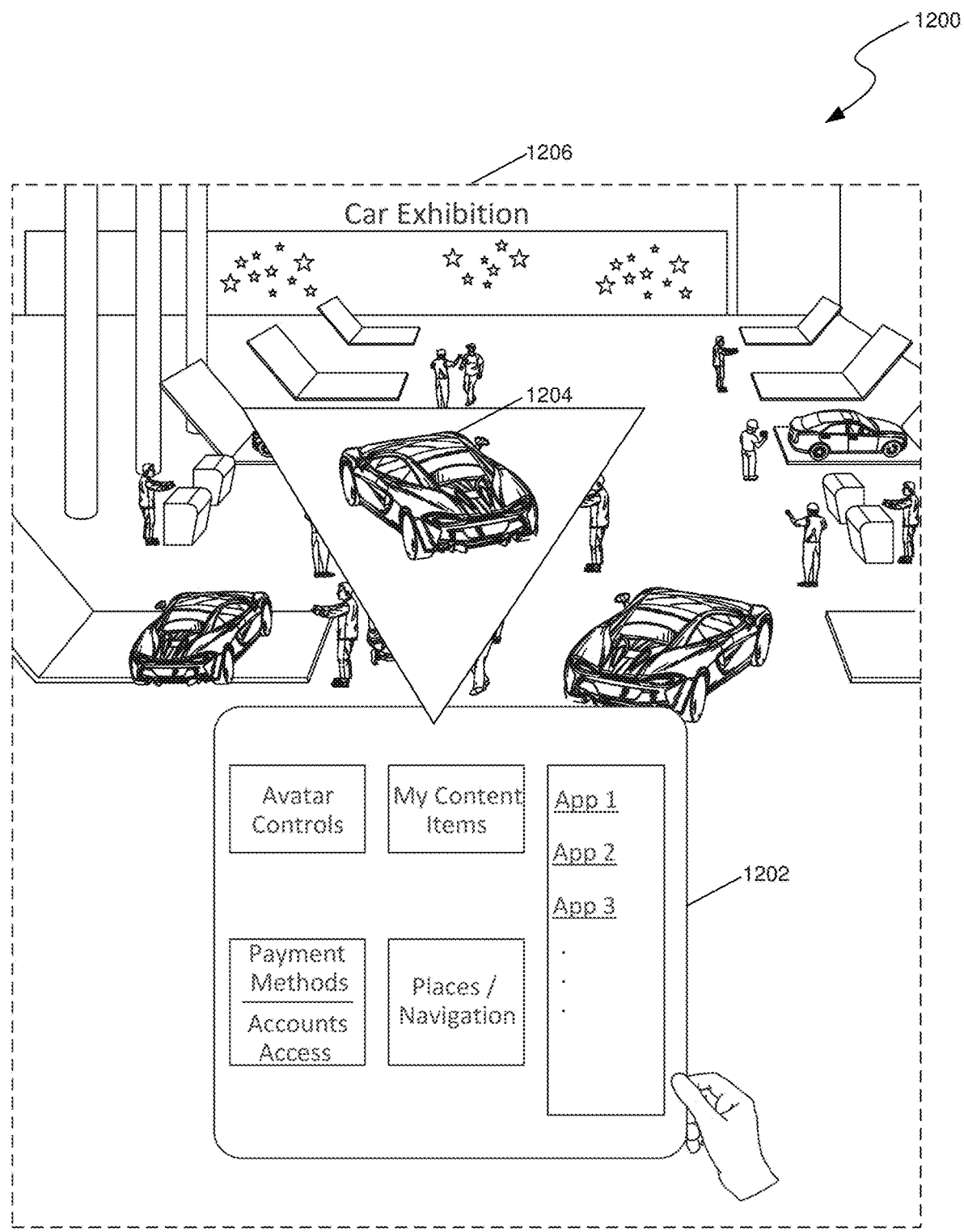
FIG. 12A is an exemplary diagram illustrating the personal interface providing 3D content separate from a world currently traveled by a user.
Figure 12B:
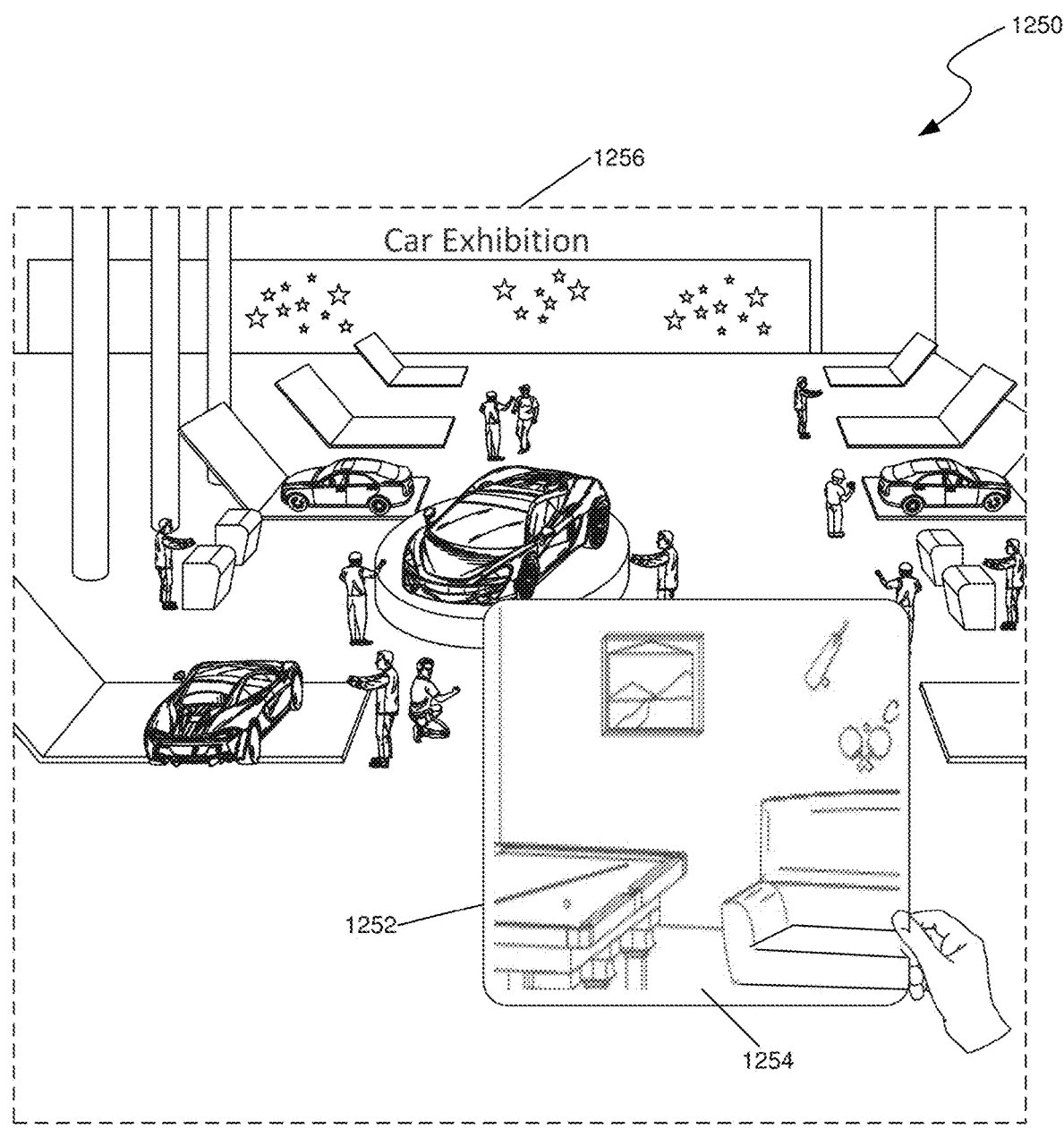
FIG. 12B is an exemplary diagram illustrating the personal interface providing a window into a virtual world other than a world currently traveled by a user.
Figure 12C:
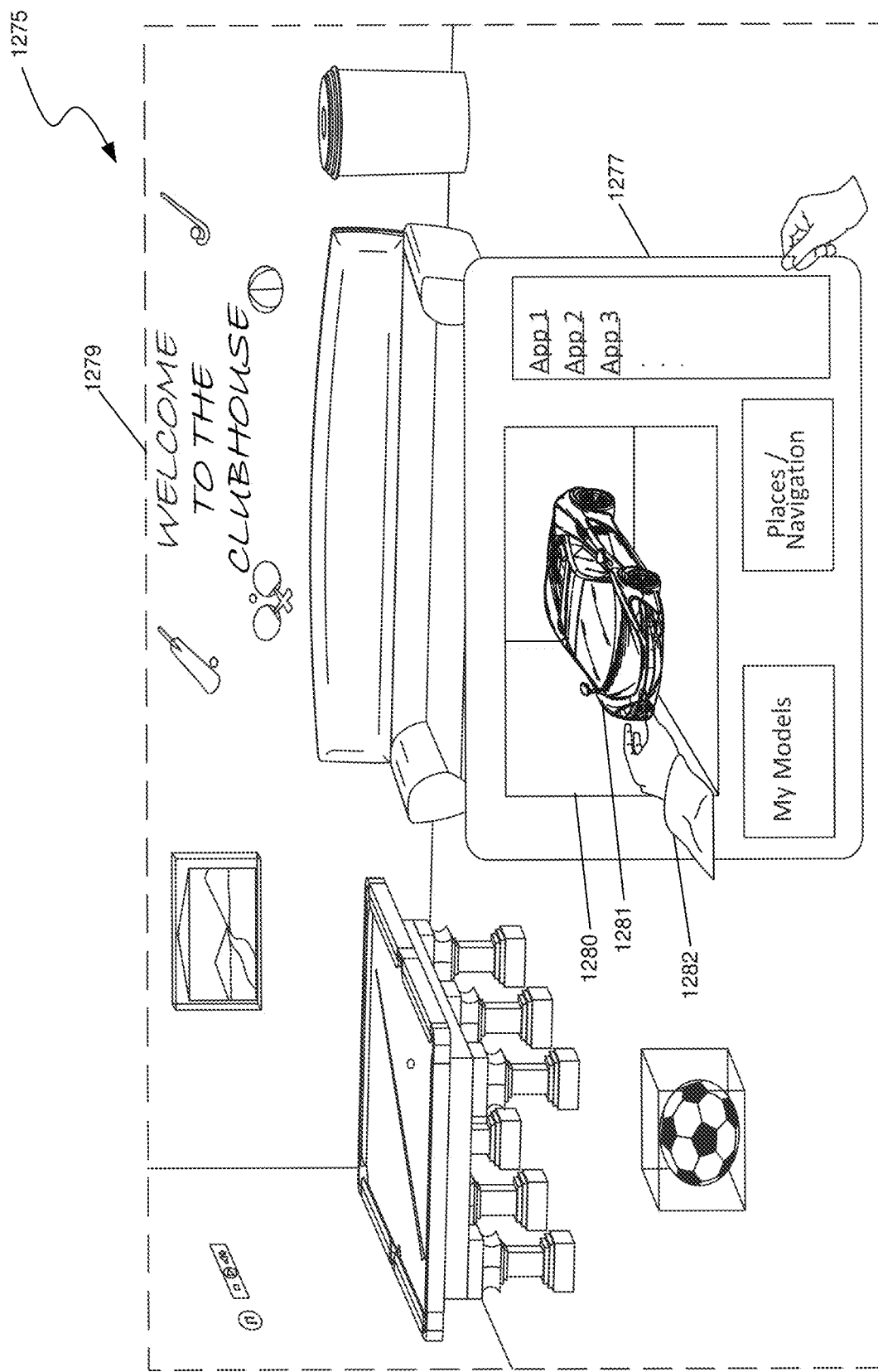
FIG. 12C is an exemplary diagram illustrating the personal interface providing a portal to view and interact with 3D content that is separate from a world currently traveled by a user.

FIGS. 12A-12C illustrate instances in which a personal interface of XR control and navigation system 164 can present 3D content in artificial reality according to various display options. For example, FIG. 12A is an exemplary diagram 1200 illustrating the personal interface 1202 providing 3D content 1204 separate from a world currently traveled by a user. The 3D content 1204 is in a vicinity of the personal interface (i.e., in a volume under control of the personal interface). In particular, the generated 3D content 1204 can relate to a world corresponding to an item to which a 3D content trigger action was directed (as discussed above in relation to FIG. 8).

As another example 1250, FIG. 12B is an exemplary diagram illustrating a personal interface 1252 providing a window 1254 into a virtual world "Clubhouse" that is other than the world currently being traveled of "Car Exhibition" 1256. Similar to FIG. 12A in that the generated 3D content can correspond to a virtual world for an item corresponding to a 3D content trigger action, the personal interface 1252 can here present that content in a window 1254 where the other virtual world is depicted as being viewed through the personal interface 1252. Here, such other virtual world corresponds to a portion of the Clubhouse depicted for FIG. 11.

As yet another example 1275, FIG. 12C is an exemplary diagram illustrating a personal interface 1277 providing a portal into a 3D volume 1280, separate from the world currently traveled by a user ("Clubhouse" 1279). In particular, the personal interface 1277 can provide the volume 1280 as a space within the personal interface 1277, through which a user can view and, in some implementations, interact with 3D content presented in the 3D volume in a runtime separate from the current virtual world (as shown here with the user's hand 1282 reaching into the volume 1280 to interact with the content item 1281).

It can be understood that implementations of the present technology can implement one or more of the display options discussed above in accordance with the particular item to which a 3D content trigger action has been directed. For instance, if a user is traveling in a current world and is interacting with a given one of "My Content Items," then a controller in control of that item can determine which display option is applicable. In other implementations, the 3D item type can be mapped to a particular display option. In yet other implementations, the system can be configured to use only one or two of the display options.

Figure 13:
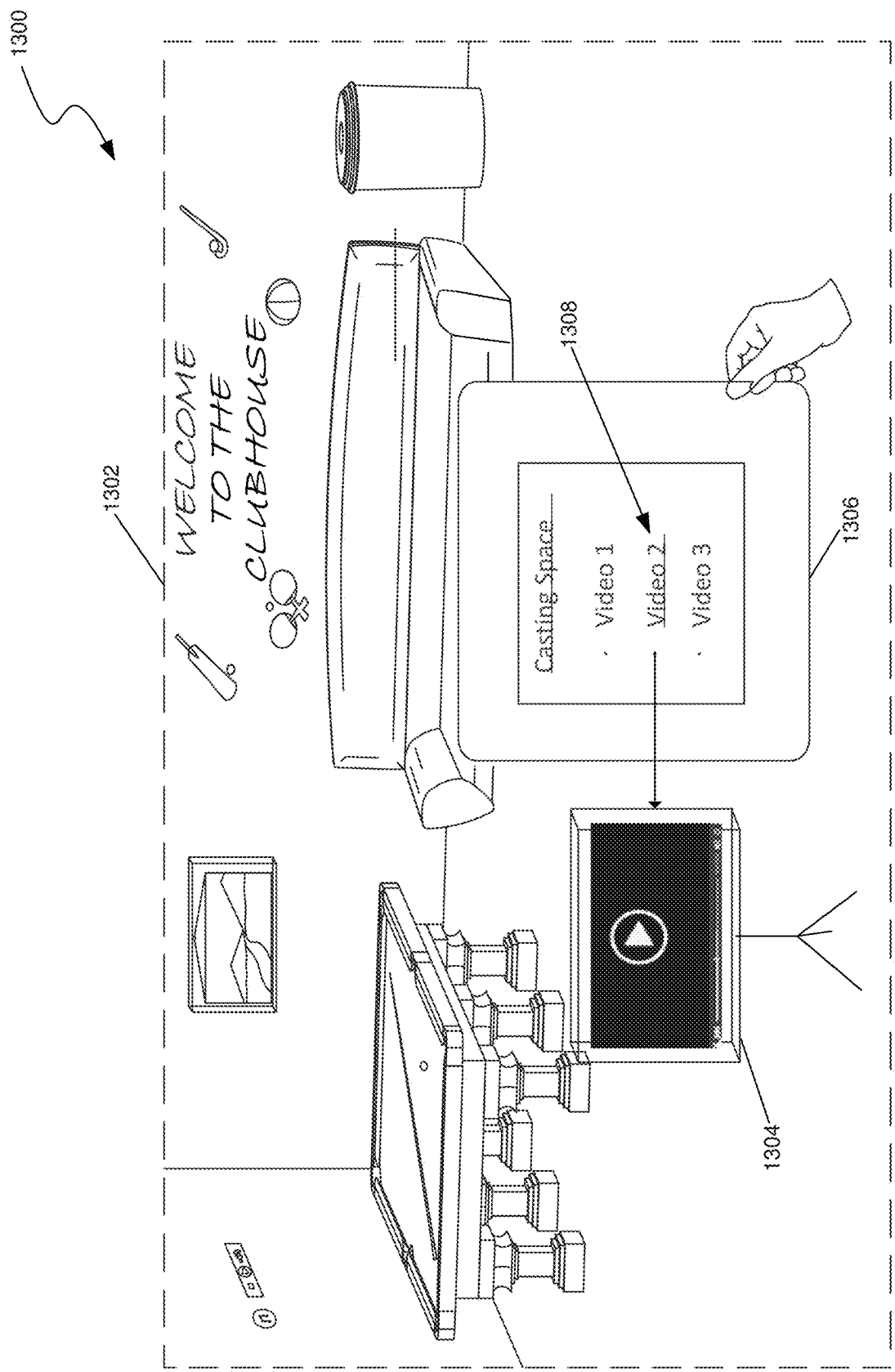
FIG. 13 is an exemplary diagram illustrating populating a dedicated space within a virtual world with content sourced by an application external to that virtual world.

FIG. 13 is an exemplary diagram 1300 illustrating populating a dedicated space 1304 within a virtual world with content sourced by an application external to that virtual world. For example, in response to a user traveling within a virtual world of "Clubhouse" 1302 and selecting a casting space 1304 (a projection screen, blank banner, open volume, etc.), the user can use a personal interface 1306 displayed to her to select content 1308 to be cast to that space. That is, the user can select, for instance, video 2, which can correspond to a video from a content provider able to cast one or more of 2D and 3D content according to a deeplink, for the casting space 1304, that delineates its respective address and content capacity. This way, a user experience for such a virtual world as Dreamland can be enhanced by the inclusion of material that can be personally selected by a user and provided from a 3rd party source.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of coordinating content display, for a 3D virtual object in a 3D artificial reality environment, from each of a first application in control of the 3D artificial reality environment, a second application in control of a 2D personal interface, and a controller associated with the 3D virtual object, the method comprising:

providing the 3D artificial reality environment, including display of the 3D virtual object by the first application;

providing the 2D personal interface as a virtual element, wherein the first application in control of the 3D artificial reality environment is executed in a first runtime and the 2D personal interface is executed in a second runtime different from the first runtime;

receiving a selection of the 3D virtual object;

in response to the selection, accessing, in a data structure for the selected 3D virtual object, a deeplink that is associated with the 3D virtual object in the first runtime and that provides access to the controller, wherein the deeplink specifies the controller with a destination for accessing the controller, and wherein accessing the deeplink from the first runtime includes making a call, to the controller at the destination, passing one or more parameters related to the selection;

receiving, in response to the call to the controller associated with the deeplink at destination, 2D content from the controller associated with the 3D virtual object; and providing, on the 2D personal interface in the second runtime and while the 3D virtual object is shown in the first runtime in the 3D artificial reality environment, an indication of the 2D content from the controller for the 3D virtual object.

2. The method of claim 1, wherein the selection of the 3D virtual object includes at least one of:
   a user interacting with the 3D virtual object through a touch or gaze action,
   the user being in a predetermined proximity of the 3D virtual object,
   the user speaking a command indicating the 3D virtual object, or
   any combination thereof.

3. The method of claim 1, wherein the one or more parameters related to the selection include one or more of:
   an identity of the 3D virtual object,
   an identity of a user who performed the selection,
   an identify of one or more other users present in the 3D artificial reality environment, or
   any combination thereof.

4. The method of claim 1, wherein the destination is:
   a module or function call in the first application,
   a module or function call in a third application, other than the first and second applications, executed by an artificial reality device that is executing the first application, or
   a URI for a service on a system external to the artificial reality device.

5. The method of claim 1, wherein the controller corresponds to a remotely served application, separate from the first application in control of the 3D artificial reality environment.

6. The method of claim 1, wherein the controller corresponds to a system component, mapped to the selected 3D virtual object, comprising one or more of:
   a people profile manager, a social graph module, or a contacts module mapped to the 3D virtual object corresponding to a person type;
   a file picker mapped to the 3D virtual object corresponding to a media player type; or a digital wallet mapped to the 3D virtual object corresponding to a payment portal type.

7. The method of claim 1, wherein the 3D virtual object is an area of the 3D artificial reality environment and the selection comprises a user entering the area of the 3D artificial reality environment.

8. The method of claim 1, wherein the accessing the deeplink is performed via a request sent under the second runtime.

9. The method of claim 1, wherein the providing the indication of the content from the controller comprises displaying in the 2D personal interface one or more of:
   a details page for the selected 3D virtual object,
   notes from a current user specified for the selected 3D virtual object,
   a 2D interface for an XR application that is the controller,
   a view into another artificial reality environment, or
   any combination thereof.

10. A non-transitory computer-readable storage medium storing instructions that, when executed by a computing system, cause the computing system to perform a process for coordinating content display, for a 3D virtual object in a 3D artificial reality environment, from each of a first application in control of the 3D artificial reality environment, a second application in control of a personal interface, and a controller associated with the 3D virtual object, the process comprising:

providing the 3D artificial reality environment, including display of the 3D virtual object by the first application;

providing the personal interface as a virtual element, wherein the first application in control of the 3D artificial reality environment is executed in a first runtime and the personal interface is executed in a second runtime different from the first runtime;

receiving a selection of the 3D virtual object;

in response to the selection, accessing, in a data structure for the selected 3D virtual object, a deeplink that is associated with the 3D virtual object in the first runtime and that provides access to the controller, wherein the deeplink specifies the controller with a destination for accessing the controller, and wherein accessing the deeplink from the first runtime includes making a call, to the controller at the destination, passing one or more parameters related to the selection;

receiving, in response to the call to controller associated with the deeplink at the destination, content from the controller associated with the 3D virtual object; and providing, on the personal interface in the second runtime and while the 3D virtual object is shown in the first runtime in the 3D artificial reality environment, an indication of the content from the controller for the 3D virtual object.

11. The non-transitory computer-readable storage medium of claim 10, wherein the providing the indication of the content from the controller comprises displaying in the personal interface one or more of:
   a details page for the selected 3D virtual object,
   notes from a current user specified for the selected 3D virtual object,
   a view into another artificial reality environment, or
   any combination thereof.

12. The non-transitory computer-readable storage medium of claim 10, wherein the selection of the 3D virtual object includes at least one of:
   a user interacting with the 3D virtual object through a touch or gaze action,
   the user being in a predetermined proximity of the 3D virtual object,
   the user speaking a command indicating the3D virtual object, or
   any combination thereof.

13. The non-transitory computer-readable storage medium of claim 10, wherein the one or more parameters related to the selection include one or more of:
 an identity of a user who performed the selection,
 an identify of one or more other users present in the 3D artificial reality environment, or
 any combination thereof.

14. The non-transitory computer-readable storage medium of claim 10, wherein the destination is:
 a module or function call in a third application, other than the first and second applications, executed by an artificial reality device that is executing the first application, or p1 a URI for a service on a system external to the artificial reality device.

15. The non-transitory computer-readable storage medium of claim 10, wherein the controller corresponds to a remotely served application, separate from the first application in control of the 3D artificial reality environment.

16. The computer-readable storage medium of claim 10, wherein the controller corresponds to a system component, mapped to the selected 3D virtual object, comprising one or more of:
 a people profile manager mapped to the 3D virtual object corresponding to a person type;
 a file picker mapped to the 3D virtual object corresponding to a media player type; or
 a digital wallet mapped to the 3D virtual object corresponding to a payment portal type.

17. The non-transitory computer-readable storage medium of claim 10, wherein the 3D virtual object is an area of the 3D_artificial reality environment and the selection comprises a user entering the area of the 3D artificial reality environment.

18. The non-transitory computer-readable storage medium of claim 10, wherein the accessing the deeplink is performed via a request sent under the second runtime.

19. A computing system for coordinating content display, for a 3D virtual object in a 3D artificial reality environment, from each of a first application in control of the 3D artificial reality environment, a second application in control of a personal interface, and a controller associated with the 3D virtual object, the computing system comprising:
 one or more processors; and
 one or more memories storing instructions that, when executed by the one or more processors, cause the computing system to perform a process comprising:
  providing the 3D artificial reality environment, including display of the 3D virtual object by the first application;
  providing the personal interface as a virtual element, wherein the first application in control of the 3D artificial reality environment is executed in a first runtime and the personal interface is executed in a second runtime different from the first runtime;
  receiving a selection of the 3D virtual object;
  in response to the selection, accessing, in a data structure for the selected 3D virtual object, a deeplink that is associated with the 3D virtual object in the first runtime and that provides access to the controller,
   wherein the deeplink specifies the controller with a destination for accessing the controller, and
   wherein accessing the deeplink from the first runtime includes making a call, to the controller at the destination, passing one or more parameters related to the selection;
  receiving, in response to the call to the controller associated with the deeplink at destination, content from the controller associated with the 3D virtual object; and
  providing, on the personal interface in the second runtime and while the 3D virtual object is shown in the first runtime in the 3D artificial reality environment, an indication of the content from the controller for the 3D virtual object.

20. The computing system of claim 19, wherein the destination is a URI for a service on a system external to an artificial reality device that is executing the first application.

\* \* \* \* \*